United States Patent
Gallagher

(10) Patent No.: US 11,493,420 B2
(45) Date of Patent: Nov. 8, 2022

(54) MEASUREMENT OF PROPERTIES OF FLOWING YIELD STRESS FLUIDS

(71) Applicant: Hydramotion Limited, Yorkshire (GB)

(72) Inventor: John Gallagher, Yorkshire (GB)

(73) Assignee: HYDRAMOTION LIMITED, Yorkshire (GB)

( * ) Notice: Subject to any disclaimer, the term of this patent is extended or adjusted under 35 U.S.C. 154(b) by 270 days.

(21) Appl. No.: 16/608,391

(22) PCT Filed: Apr. 27, 2018

(86) PCT No.: PCT/GB2018/051138
§ 371 (c)(1),
(2) Date: Oct. 25, 2019

(87) PCT Pub. No.: WO2018/197902
PCT Pub. Date: Nov. 1, 2018

(65) Prior Publication Data
US 2020/0249142 A1   Aug. 6, 2020

(30) Foreign Application Priority Data

Apr. 27, 2017   (GB) ...................................... 1706734

(51) Int. Cl.
*G01N 11/16* (2006.01)
*G01N 11/00* (2006.01)

(52) U.S. Cl.
CPC .... *G01N 11/162* (2013.01); *G01N 2011/0033* (2013.01)

(58) Field of Classification Search
None
See application file for complete search history.

(56) References Cited

U.S. PATENT DOCUMENTS

| | | | | |
|---|---|---|---|---|
| 3,943,753 A | * | 3/1976 | Simon | G01N 11/16 73/54.25 |
| 2011/0000285 A1 | * | 1/2011 | Biggs | G01N 29/4427 73/54.41 |
| 2013/0192349 A1 | * | 8/2013 | Ramkumar | G01N 29/02 73/54.41 |

* cited by examiner

*Primary Examiner* — Paul M. West
*Assistant Examiner* — Mark A Shabman
(74) *Attorney, Agent, or Firm* — Fredrikson & Byron, P.A.

(57) ABSTRACT

A model of the viscoplastic boundary layer of a yield stress fluid is described and, based on which, there is provided a method of estimating the yield stress of a flowing yield stress fluid using one or more vibratory transducers having a vibratory surface in contact with the yield stress fluid, the method comprising: vibrating a vibratory surface of a vibratory transducer to transmit a wave from a vibrating surface into a viscoplastic boundary layer of the flowing yield stress fluid, the wave propagating a distance into the viscoplastic boundary layer; making, using the vibrations of the vibratory transducer, one or more measurements of the degree of damping of vibration; and estimating the yield stress of the flowing yield stress fluid based on the one or more measurements of the degree of damping of vibration. There are disclosed single-frequency, dual-frequency and triple-frequency modes of operation.

54 Claims, 11 Drawing Sheets

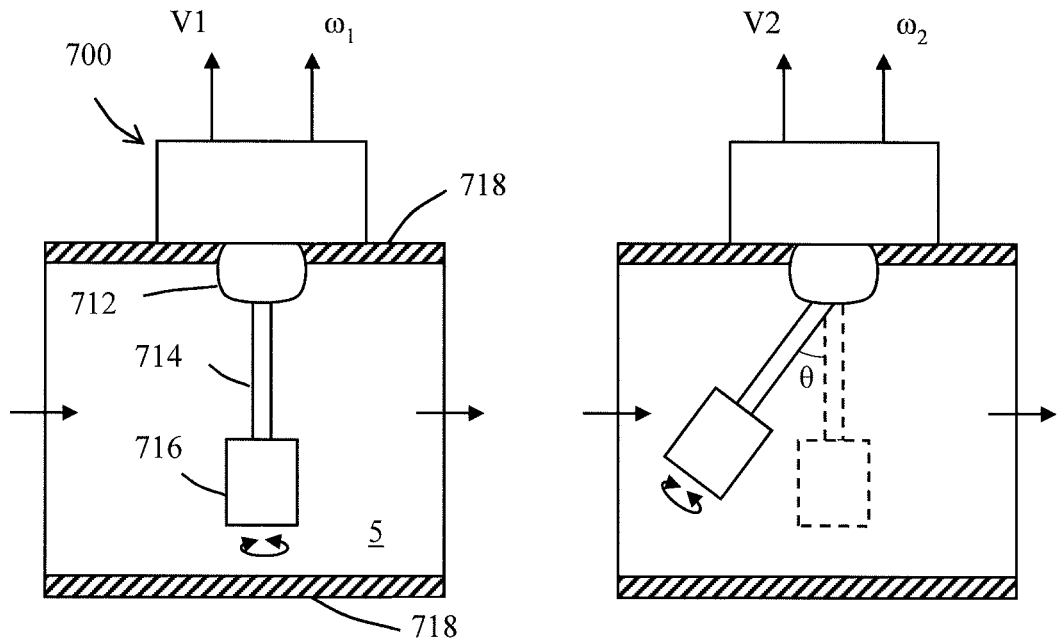
FIGURE 27A
FIGURE 27B
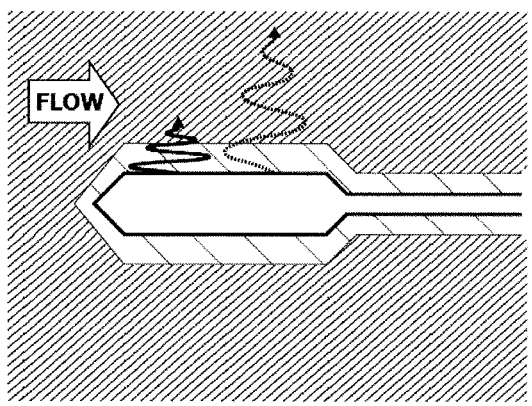
FIGURE 28
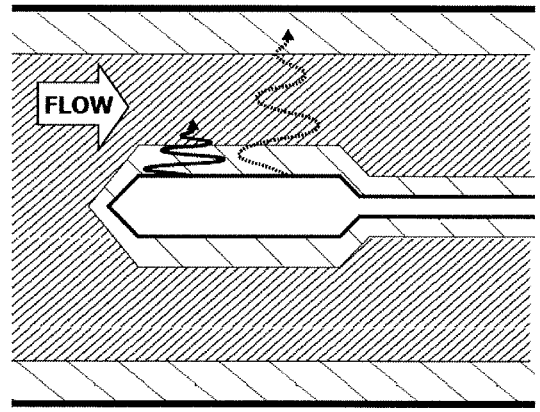
FIGURE 29

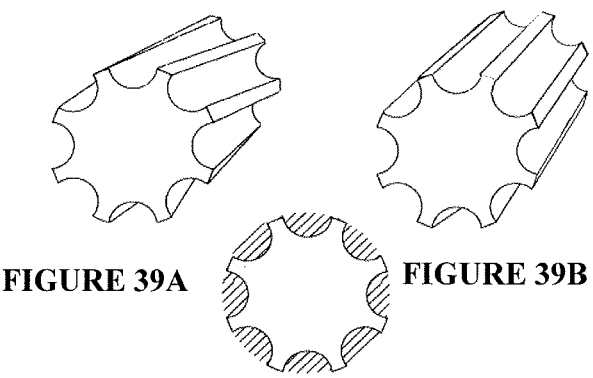
FIGURE 39A  FIGURE 39B
FIGURE 39C
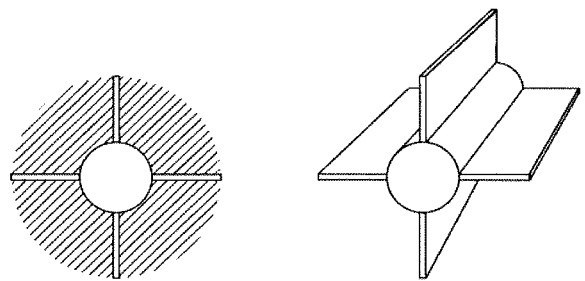
FIGURE 40A  FIGURE 40B

MEASUREMENT OF PROPERTIES OF FLOWING YIELD STRESS FLUIDS

RELATED APPLICATIONS

This application is a 35 U.S.C. 371 national stage filing from International Application No. PCT/GB2018/051138, filed Apr. 27, 2018, which claims priority to British Application No. 1706734.9, filed Apr. 27, 2017, the teachings of which are incorporated herein by reference.

BACKGROUND

The present disclosure relates to techniques and apparatus for the measurement of fluid properties, and is concerned particularly with determining a yield stress of a non-Newtonian fluid.

In a Newtonian fluid, the shear stress is directly proportional to the shear rate, the constant of proportionality being the viscosity of the fluid. Therefore the viscosity as a single parameter can be used to model or define the relationship between shear stress and shear rate of the fluid, and therefore the flow behaviour of Newtonian fluids. Water is an example of a Newtonian fluid.

In a non-Newtonian fluid, the relationship between shear stress and shear rate is not so simple. The apparent viscosity of the fluid is found to vary with, for example, the shear stress or the shear rate. Fluids that exhibit non-Newtonian behaviour include tomato ketchup, mayonnaise and paint. The study of the flow of these types of fluids is the field of 'rheology'.

Rheological models have been generated for non-Newtonian fluids, for which a small number of parameters can be obtained for a fluid, which may be used to determine the relationship between shear stress and shear rate in the fluid over a range of shear stresses or shear rates, or in other words the 'apparent' viscosity provided by the fluid under those particular conditions.

In the prior art, such parameters of rheological models are typically determined using a device that exerts shear forces in a fluid sample using a rotating or oscillating element. Complex viscoelastic parameters are usually determined by analysing the relationship between the shear rate and the developed shear stress. However, the devices use sensitive moving parts and their performance, and therefore the accuracy of measurement, can become affected by the environmental conditions in which they are used. Furthermore, the need to manage the fluid sample within a carefully defined volume, in order to calculate the shear rate accurately, generally makes these types of apparatus suitable only for the laboratory environment.

Of special interest is the real time measurement of the yield stress of a fluid. Yield stress is defined as the stress required in order for solid matter to flow and represents the point of plastic deformation of the solid. It is a feature of many fluids and has particular importance in the manufacture of foods, paints and petro-geological fluids, for example, but also in naturally occurring materials such as muds and sediments.

The details and origins of yield stress behaviour of fluids is a subject of interest to researchers. Traditional approaches to determining a yield stress are set out in "Yield Stress in Foods: Measurements and Applications" of Sun et al (International Journal of Food Properties, volume 12, pp 70-101, 2009), and in "Understanding Yield Stress Measurements", a white paper produced by Malvern Instruments Limited of Grovewood Road, Malvern, Worcestershire, UK.

Traditional approaches measure yield stress of a static sample.

For example, in the extrapolation approach, there is extrapolation of the shear stress versus shear rate data obtained from conventional rheometers. The experimental data is extrapolated back to zero shear rate to obtain the yield stress value at the shear stress intercept.

For example, in the stress relaxation approach, the fluid material is first sheared at either constant shear rate or constant shear stress in a conventional rotational viscometer, followed by bringing the material to rest either gradually or suddenly. The yield stress is then measured as residual stress remaining in the fluid upon cessation of flow.

For example, in the creep/recovery response approach, a constant shear stress is applied in steps to the fluid material. If stresses applied are below the yield stress, the test material behaves as an elastic solid with a complete recovery upon removal of stress and it will not flow. The yielding point can be detected from a drastic change of slope in the time vs. shear strain curve.

For example, in the shear stress ramp approach, a gradual step increase is applied to the sample. The instantaneous (or apparent) viscosity is monitored for the presence of an inflexion point, which indicates onset of flow, and the yield stress.

For example, in the cone penetrometer approach, a metal cone of specific dimensions is forced into the surface of test specimen. The cone gradually slow down until it comes to rest. The yield stress is calculated as a function of the penetration depth when the cone stops.

For example, in the dynamic oscillation approach, the material is subjected to a sinusoidal strain and the resulting stress is measured as a function of both time and frequency. Depending on the strain amplitude, small deformations occur within the material. The presence of a low frequency plateau in the curve can be correlated to the yield stress.

For example, in the inclined plane approach, a uniform fluid layer is placed on an initially horizontal plane, followed by progressively increasing the angle of inclination of the plane until a critical value is reached, whereby the fluid starts to flow. The yield stress is correlated with the angle of inclination for the fluid to flow.

For example, in the vane technique, a vaned device is immersed in the material. The vane geometry consists of a vane spindle with typically four to eight thin blades arranged at equal angles, cantered on a narrow cylindrical shaft of a rheometer or viscometer. The vane can be operated under controlled shear-rate mode or controlled shear stress mode; in both cases the yield stress is the minimum stress required for continuous rotation of the vane.

For example, in the squeezing flow approach, a sample of fluid is placed between the two parallel test surfaces of a bench rheometer or viscometer and squeezed in either a 'constant volume' or 'constant area' arrangement. The determination of the yield stress from squeezing flow is based on the residual stress after shear and relaxation.

For example, in the plate method, a plate is immersed into a container filled with sample material. An attached balance records the force required to create plate movement and this is combined with the buoyancy force to determine yield stress.

For example, in the slump test, a cylindrical mould is filled with the test fluid and the mould is lifted off to allow the material to collapse and flow under its own weight. The slump height, which is the difference between the initial and final heights is measured and provides an inverse relationship with yield stress.

Unlike the above-described techniques, another traditional approach allows for yield stress measurement of a flowing sample, by way of the use of magnetic resonance imaging (MRI), whereby a material sample flowing at a constant velocity through a tube is flow imaged using an MRI scanner. The MRI scanner is able to measure the flow profile (flow velocity) of the fluid across the pipe. The flow profile is combined with an estimate of stress from the differential pressure along the pipe to provide a measurement of yield stress.

The disadvantage of almost all of the above traditional approaches to determining the yield stress of a fluid is the requirement for a captive sample in a static (non-flowing) environment. This makes these methods unsuitable for real-time measurement. The traditional methods requiring captive samples are largely confined to intermittent spot measurements and the laboratory environment.

It would be desirable to provide fast real-time rheology measurement of yield stress fluids under live conditions. This would allow detailed assessment of large material volumes and improved capability for their control and management. In particular, in process industries, in-line measurement is advantageous in that it allows for continuous product control. A feedback loop may allow parameters of the process to be adjusted based on in-line measurements of yield stress. While the traditional approaches using captive static samples may be used to take periodic measurements, there is inevitably a measurement lag. The provision of faster measurements in-line would reduce or eliminate the measurement lag and thus improving the controllability of the process, which can increase product consistency and reduce waste.

In other applications such as the measurement of rheological properties of drilling muds and lubricants, the fast real time rheological measurement of yield stress under live conditions may improve efficiency by allowing faster intervention to correct drift in fluid properties away from desired or permitted ranges.

In marine, civil engineering, mining and geotechnical fields it would be desirable to provide fast measurement of flowing materials with important rheology features such as poured concretes and cements, slurries and muds, in situ, without taking captive static samples, providing increased accuracy due to ease of taking multiple data points, while reducing or eliminating delays involved with spot testing and laboratory turnaround times.

SUMMARY

The inventor has determined that the behaviour of yield stress fluids at a viscoplastic boundary layer can be modelled using three phases. This model is termed herein a 'tri-viscous' model to distinguish it from existing models of the boundary layer that use two phases and are termed 'bi-viscous'. In considering developed flow of a yield stress fluid over a stationary plate, a viscoplastic boundary layer develops because friction of the stationary plate causes shear stresses in the fluid relative to the flow away from the stationary plate. Away from the stationary plate and beyond the boundary layer, the yield stress fluid is wholly unyielded, i.e. solid. Inside the boundary layer and close to the stationary plate, the yield stress fluid is wholly yielded, i.e. liquid. In the tri-viscous model there is also a third state beginning at an intermediate distance within the boundary layer and extending to the boundary layer, separating the wholly yielded and wholly unyielded regions. According to the tri-viscous model, this third region is a transitional region where the material is neither wholly yielded nor wholly unyielded, but is instead a region of fragmented solid in a liquid phase.

If, instead of a stationary plate, the fluid is flowing over a vibrating surface, waves are generated that propagate into the fluid that behave differently in different phases of the fluid. Put simply, it has been found that waves propagating in the wholly unyielded, i.e. solid, region beyond the boundary layer experience low loss, waves propagating in the wholly yielded, i.e. liquid, region within the boundary layer and close to the vibrating surface experience medium loss, and waves propagating in the transitional region beyond the wholly yielded region but within the boundary layer experience high loss. Body waves such as shear waves travel easily in solids and thus the loss is low. In the fully yielded material the loss is higher due to viscosity, but not as high as in the transitional region. Without wishing to be bound by theory, it is believed that the granular nature of the transitional zone, with weakly sheared semi-solid or fragmented solid in a liquid phase, frustrates the propagation of waves such as shear waves causing the high loss and that this is via the interaction between a semi-solid or solid fragment and the liquid and via the interaction between solid fragments. Thus according to the bi-viscous model, the energy loss of propagating waves decreases as waves propagate greater distances from the vibrating surface through a boundary layer of liquid (medium loss) to a region of solid (low loss) beyond the boundary layer.

This difference in behaviour can be used to estimate the yield stress of the fluid, or other rheological properties of the fluid and in some cases the flow velocity of the fluid.

According to the techniques of this disclosure, there are multiple approaches to determining a fluid property such as the yield stress. One approach is to use vibration at a single frequency. Another is a dual frequency approach, wherein vibration at two different frequencies is used. Another approach is a triple frequency approach, wherein vibration at three different frequencies.

For the single frequency approach, a wave emanating from a vibratory surface of a vibratory transducer into a boundary layer of a yield stress fluid experiences attenuation, or energy loss, depending on the region it encounters. Where the penetration depth is sufficiently long, i.e. the frequency is sufficiently low, the wave can reach the transitional region and thereby experience the high energy loss due to the presence of the mixed solid and liquid phase. Without wishing to be bound by theory, it is believed that viscous damping from the liquid phase will also add to the measured energy dissipation and the amount of transitional layer damping will be influenced by the proximity of the layer which varies inversely (although not necessarily inversely proportionally) with flow velocity. Where the material has no yield stress there is no solid region and no transitional region and the dissipation is therefore just a feature of attenuation due to viscous damping of the liquid. The yield stress causes the formation of the transitional region, which causes the high attenuation of the wave and the energy loss, which can be determined by measuring the degree of damping of vibration. This may be by measuring the apparent viscosity, perhaps via a measurement of the Q-factor of the vibration. From experiments it has been determined that, at constant viscosity and flow, the measured apparent viscosity (i.e. loss) is proportional to the yield stress of the material. Thus, there may be a method of estimating the yield stress of a flowing yield stress fluid using one or more vibratory transducers having a vibratory surface in contact with the yield stress fluid, the method comprising: vibrating a vibratory surface of a vibratory transducer to transmit a wave from a vibrating surface into a viscoplastic boundary layer of the flowing yield stress fluid; making, using the vibrations of the vibratory transducer, one or more measurements of the degree of damping of vibration; and estimating the yield stress of the flowing yield stress fluid based on the one or more measurements of the degree of damping of vibration, wherein the viscosity of the yield stress fluid and the flow rate are constant and the estimate of the yield stress is equal to the measured degree of damping of vibration multiplied by a constant of proportionality for the given constant viscosity and flow rate.

For the dual frequency approach, by employing a second vibrational wave of higher frequency, and therefore lower penetration depth into the material, so that the wave dissipates wholly or largely in the liquid region and does not propagate into the transitional region, the energy dissipation associated with liquid viscosity only can be determined independently from the second measurement. By comparing a first measurement of the degree of damping (e.g. apparent viscosity of unyielded material) for a wave propagating into the transitional region with a second measurement of the degree of damping for a wave propagating only into the liquid (yielded) region, the 'common-mode' effect of viscosity from the liquid phase can be nulled or cancelled from the measurement of the yield stress resulting from the loss in the transitional region. It is further believed that the ratio or difference of the two measurements of degree of damping (e.g. apparent viscosity) is related to the boundary layer depth which is an inverse function of the fluid velocity in the unyielded, i.e. solid, region. This ratio can therefore be scaled to provide an indication of fluid velocity which in turn can be used to correct the primary yield stress estimate for the effect of flow. Thus there may be a method of estimating the yield stress of a flowing yield stress fluid using one or more vibratory transducers having a vibratory surface in contact with the yield stress fluid, the method comprising: vibrating a vibratory surface of a vibratory transducer to transmit a wave from a vibrating surface into a viscoplastic boundary layer of the flowing yield stress fluid; making, using the vibrations of the vibratory transducer, one or more measurements of the degree of damping of vibration; and estimating the yield stress of the flowing yield stress fluid based on the one or more measurements of the degree of damping of vibration. wherein a first measurement of the degree of damping of vibration is made with the vibratory surface of a vibratory transducer vibrating at a first frequency of vibration to transmit a wave that propagates a first distance into the viscoplastic boundary layer of the flowing yield stress fluid; wherein a second measurement of the degree of damping of vibration is made with the vibratory surface of a vibratory transducer vibrating at a second frequency of vibration that is different from the first frequency to transmit a wave that propagates a second distance into the viscoplastic boundary layer of the flowing yield stress fluid that is lower than the first distance; and wherein the yield stress of the flowing yield stress fluid is estimated based on a linear combination of the first and second measurements of the degree of damping of vibration.

For the triple frequency approach, a third, even higher, frequency can also be used, for which the wave penetration depth is still within the wholly liquid region. Using the second and third measurements that both propagate wholly or largely in the liquid region, the degree to which the fluid exhibits non-Newtonian behaviour can also be determined, which in turn can be used to update or correct or improve the accuracy of the estimate of the yield stress. The degree to which a fluid is non-Newtonian is characterised by the 'power law index', n and consistency factor K. These parameters can be determined by applying the Cox-Merz rule, which equates the shear rate to the angular frequency of vibration, and solving equations of the Power Law model using measured viscosities and frequencies.

In a similar way to the Power Law Model, the fluid parameters of yield stress $\sigma_0$, Power Law Index n, Consistency K, and Plastic Viscosity PV for the established Casson and Herschel-Bulkley fluid models can be solved using known values of viscosity, V, at different sensor frequencies, $\omega$.

Thus taking into account the above single-frequency, dual-frequency, and triple-frequency approaches, there is provided according to a first aspect of the invention a method of estimating the yield stress of a flowing yield stress fluid using one or more vibratory transducers having a vibratory surface in contact with the yield stress fluid, the method comprising: vibrating a vibratory surface of a vibratory transducer to transmit a wave from a vibrating surface into a viscoplastic boundary layer of the flowing yield stress fluid; making, using the vibrations of the vibratory transducer, one or more measurements of the degree of damping of vibration; and estimating the yield stress of the flowing yield stress fluid based on the one or more measurements of the degree of damping of vibration.

Preferably, the wave propagates into what is a region which is, according to the tri-viscous model, believed to be a transitional region between solid and liquid. This may be the portion of the boundary layer that is most distant from the vibratory surface. While the thickness of a boundary layer and transitional region may vary with material properties, as may the penetration depth of a wave, it has been observed that in many yield stress fluids of industrial importance, such as molten chocolate, this can be achieved in the case of shear wave propagation by a frequency of around 300 Hz, and/or that the shear wave is required to propagate at least several millimetres into the boundary layer.

A shear wave propagating from a vibratory surface will dissipate to a skin depth a distance d from the surface. The penetration or propagation depth in a viscoelastic fluid varies with the loss tangent of the material. But, for illustration, the simpler Newtonian interpretation of this distance may be used, in which the skin depth is given by the square root of the ratio of twice the viscosity to the product of the angular frequency and the density. By this, the propagation depth is the depth into the fluid by which the amplitude of oscillation of the has reduced to 1/e of its initial value, wherein e is the base of natural logarithms, i.e. about 37%. Other penetration depths may be appropriate to use in the case waves other than shear waves, these are described in the literature and may be familiar to the skilled reader.

Put another way, a wave may be considered to have propagated sufficiently into the boundary layer to experience the high loss transitional region if it propagates a distance of (or has a propagation depth greater than or equal to) at least about half of the thickness of the viscoplastic boundary layer. This may be about 1 mm, about 2 mm, about 3 mm, about 4 mm, about 5 mm, about 6 mm, about 7 mm, about 8 mm, about 9 mm, about 10 mm or more, according to the particular material properties and conditions. It might be assumed that waves propagating smaller distances into the boundary layer might not experience the high loss transitional region and may propagate solely in the wholly liquid region. This may be, for fluids of industrial importance, vibrating at a frequency of about 300 Hz. In practical terms, lower frequencies may be preferred as they propagate further, but it might be preferable for the minimum frequency to be above about 100 Hz or alternatively above about 200 Hz, since lower frequencies might increase the amount of plant noise picked up in the measurements and also make greater demands on the transducer used to generate the waves. A possible range of frequencies might be about 200 Hz to about 500 Hz for many fluids. In Boujlel et al "Boundary Layer In Pastes—Displacement Of A Long Object Through A Yield Stress Fluid" (Journal of Rheology, volume 56, 2012, doi:10.1122/1.4720387), there is presented a theoretical derivation of viscoplastic boundary layer thickness for Poiseuille flow, as well as presenting multiple explicit expressions for the boundary layer thickness as a function of velocity and rheological parameters. It is further observed experimentally that the boundary layer thickness for flow over a plate tends to stabilize away from the plate's leading edge, to a value of approximately 10 mm that is found to vary only weakly with velocity. It may be possible to determine whether or not a shear wave or other body wave is propagating into the transitional region or beyond by varying the frequency of vibration because of the sharp increase in energy loss as waves begin to propagate into the transitional region. Thus it may be straightforward to determine a frequency of vibration that will propagate into the portion of the boundary layer more distant from the vibrating surface, i.e. the transitional region by routine variation of frequency of vibration. One possibility might be to perform a frequency sweep although other, more efficient, sampling techniques may be preferred, such as a binary search. There may be a method of estimating the yield stress of a flowing yield stress fluid using one or more vibratory transducers having a vibratory surface in contact with the yield stress fluid, the method comprising: vibrating a vibratory surface of a vibratory transducer to transmit a wave from a vibrating surface into a viscoplastic boundary layer of the flowing yield stress fluid; making, using the vibrations of the vibratory transducer, one or more measurements of the degree of damping of vibration; and estimating the yield stress of the flowing yield stress fluid based on the one or more measurements of the degree of damping of vibration, the wave propagates into a portion of the boundary layer distant from the vibratory surface, such as propagating a distance of at least about half of the thickness of the viscoplastic boundary layer, which in many cases of industrial importance might involve a frequency less than about 500 Hz or propagating a distance of 1 mm, 2 mm, 3 mm, 4 mm, 5 mm, 6 mm, 7 mm, 8 mm, 9 mm or 10 mm, or propagating a distance such that the energy loss increases with distance from the vibratory surface.

In a preferred—dual frequency—embodiment, a first measurement of the degree of damping of vibration is made with the vibratory surface of a vibratory transducer vibrating at a first frequency of vibration to transmit a wave that propagates a first distance into the viscoplastic boundary layer of the flowing yield stress fluid; a second measurement of the degree of damping of vibration is made with the vibratory surface of a vibratory transducer vibrating at a second frequency of vibration that is different from the first frequency to transmit a wave that propagates into the viscoplastic boundary layer of the flowing yield stress fluid; and the yield stress of the flowing yield stress fluid is estimated based on a linear combination of the first and second measurements of the degree of damping of vibration. Such a method may advantageously have reduced or eliminated sensitivity to noise and error resulting from, for example, temperature fluctuations. This may be due to the reduction or elimination of sensitivity to common-mode viscosity.

While it is preferable that one measurement is made for vibrations that cause a wave to propagate into the transitional region, e.g. propagate a distance of at least about half the boundary layer thickness, it is also preferably that another measurement is made for vibrations that cause a wave to propagate only into the liquid region, i.e. propagate a distance of less than about half the boundary layer thickness. This may be propagation depth of less than about 1 mm, about 2 mm, about 3 mm, about 4 mm, or about 5 mm, about 6 mm, about 7 mm, about 8 mm, about 9 mm, about 10 mm. More preferably, such a wave may propagate from the vibratory surface into the boundary layer only a distance of about 10%, about 20%, about 30%, or about 40% of the boundary layer thickness. In observations it has been found that, for many yield stress fluids of industrial importance, a vibrational frequency of about 2 kHz may be appropriate, although a possible range might be from about 800 Hz to about 2.5 kz or higher. It may be possible to determine whether or not a shear wave or other body wave is propagating into the transitional region or beyond by varying the frequency of vibration because of the sharp increase in energy loss as waves begin to propagate into the transitional region. Thus it may be straightforward to determine a frequency of vibration that will not, or not significantly propagate into the portion of the boundary layer more distant from the vibrating surface, i.e. the transitional region by routine variation of frequency of vibration. There may be a method of estimating the yield stress of a flowing yield stress fluid using one or more vibratory transducers having a vibratory surface in contact with the yield stress fluid, the method comprising: vibrating a vibratory surface of a vibratory transducer to transmit a wave from a vibrating surface into a viscoplastic boundary layer of the flowing yield stress fluid, the wave propagating a distance of at least about half of the thickness of the viscoplastic boundary layer; making, using the vibrations of the vibratory transducer, one or more measurements of the degree of damping of vibration; and estimating the yield stress of the flowing yield stress fluid based on the one or more measurements of the degree of damping of vibration, wherein a first measurement of the degree of damping of vibration is made with the vibratory surface of a vibratory transducer vibrating at a first frequency of vibration to transmit a wave that propagates a first distance into the viscoplastic boundary layer of the flowing yield stress fluid; wherein a second measurement of the degree of damping of vibration is made with the vibratory surface of a vibratory transducer vibrating at a second frequency of vibration that is different from the first frequency to transmit a wave that propagates a second distance into the viscoplastic boundary layer of the flowing yield stress fluid that is lower than about half the thickness of the viscoplastic boundary layer; and wherein the yield stress of the flowing yield stress fluid is estimated based on a combination of the first and second measurements of the degree of damping of vibration, preferably a linear combination of the first and second measurements of the degree of damping of vibration.

Preferably, the method further comprises performing a correction to one or both of the first and second measurements of the degree of damping of vibration based on the first and second frequencies of vibration and the power law index of the yield stress fluid. the estimate of the yield stress of the flowing yield stress fluid is proportional to the expression $(V1-V2(\omega 1/\omega 2)^{\wedge}(n-1))$, wherein V1 is the first measurement of the degree of damping of vibration, V2 is the second measurement of the degree of damping of vibration, $\omega 1$ is the angular frequency of the first frequency of vibration, $\omega 2$ is the angular frequency of the second frequency of vibration, and n is the power law index.

The power law index may be known for many fluids of industrial importance, but another preferred—triple frequency—embodiment employs a third frequency of vibration and allows the power law index to be determined from measurements of the fluid itself. In particularly, the method preferably further comprises making a third measurement of the degree of damping of vibration with the vibratory surface of a vibratory transducer vibrating at a third frequency of vibration that is different from the first and second frequencies of vibration to transmit a wave; and estimating the power law index of the flowing yield stress fluid based on the third measurement of the degree of damping of vibration and the third frequency of vibration and further based on one of: the first measurement of the degree of damping of vibration and the first frequency of vibration; and the second measurement of the degree of damping of vibration and the second frequency of vibration. The particular choice will depend on the particular frequencies and propagation depths at which the measurements are made.

In the case of a triple frequency mode, is also preferably that a third measurement is made for vibrations that cause a wave to propagate only into the liquid region, i.e. propagate a distance of less than about half the boundary layer thickness. This may be propagation depth of less than about 1 mm, about 2 mm, about 3 mm, about 4 mm, or about 5 mm. More preferably, such a wave may propagate from the vibratory surface into the boundary layer only a distance of about 15% of the boundary layer thickness. Thus the three wave propagation distances might be, relative to the boundary layer thickness, about 15%, about 30%, and greater than 50%. In observations it has been found that, for many yield stress fluids of industrial importance, a vibrational frequency of about 3 kHz may be appropriate for this third measurement, but a possible range might be from about 1 kHz or higher, depending on the particular frequency for the second measurement. Thus possible frequencies might be of the order of 300 Hz, 2 kHz, and 3 kHz, or alternatively, about 200 Hz to about 500 Hz, about 800 Hz up to about 2.5 kHz or higher, and about 1 kHz or higher.

In another preferred embodiment, any of the above-described dual frequency or triple frequency mode methods may further comprising estimating a flow velocity of the flowing yield stress fluid based the ratio of the first and second measurements of the degree of damping of vibration. This is advantageous because many traditional methods of measuring a flow velocity do not operate well with yield stress materials.

In another preferred embodiment, a first measurement of the degree of damping of vibration is made with the vibratory surface of a vibratory transducer vibrating at a first frequency of vibration; wherein a second measurement of the degree of damping of vibration is made with the vibratory surface of a vibratory transducer vibrating at the first frequency while the flow around the vibrating surface of the vibratory transducer is different from the flow around the vibrating surface of the vibratory transducer when making the first measurement of the degree of damping of vibration leading to a different distribution of yielded and unyielded material flowing around the vibratory transducer; and wherein the yield stress of the flowing yield stress fluid is estimated based on the first and second measurements of the degree of damping of vibration. Advantageously, the yield stress may thus be determined using one or more single-mode transducers at the same mode such by using a single single-mode transducer. The method may comprise changing, between the making of the first and second measurements of the degree of damping of vibration, a flow velocity of the yield stress fluid. Alternatively or additionally, the flow around the vibrating surface of the vibratory transducer is different from the flow around the vibrating surface of the vibratory transducer when making the first measurement of the degree of damping of vibration due to one or more of: eccentric stirring of the yield stress fluid; changing a position and/or orientation of the vibratory transducer relative to a flow of the yield stress fluid; changing a position and/or orientation of an obstruction affecting flow around the vibratory transducer.

In other preferred embodiments, one or more recesses or one or more ridges are provided on a vibrating surface of the one or more the vibratory transducers, or are provided on an adjacent portion of a conduit wall. Advantageously, this approach may be used to tune or boost the sensitivity of the method by changing the amount of solid yield stress material adjacent and around the transducer. This may be for shaft-and-bob-type vibratory transducers, wherein the bob comprises one or more recesses on the surface of the bob. They may be configured to shelter yield stress fluid from the flow. As such, the yield stress fluid that is sheltered may move with the vibratory surface of the transducer in an unyielded state. The shear surface, at which the yielding takes place, may be separated from the surface of the transducer. Thus by judicious use of recesses and ridges, wave propagation through different phases of the tri-viscous model may be achieved relative to a smooth bob. A wave that might propagate a given distance in a boundary layer formed over a smooth surface and might usually experience only liquid—wholly yielded—material, might propagate into a transitional region according to the placement of ridges and recesses and the flow geometry and whether wholly yielded material is retained at the vibratory surface. Similar effects may be obtained for other transducers such as a shaft-and-disc transducer or a vibrating tube transducer. These techniques are not limited to the ridges and recesses described here, but apply in principle to any contouring of the sensor, conduit (understood herein to include a vessel) or other obstruction that creates a regions of flow and 'flow shadow', or indeed sensor orientations; these may be used to tune any of the techniques described herein.

Preferably, and for simplicity when using existing vibratory transducers that output the measured viscosity of a fluid, making a measurement of the degree of damping of vibration comprises obtaining the apparent viscosity of the yield stress fluid. In some cases this may be based on a measurement of the Q factor of vibration.

According to a further aspect of the invention, there is provided a method of detecting flow in a yield stress fluid that is initially static, the method comprising: making a series of measurements of the degree of damping of the yield stress fluid using at least one vibratory transducer; and determining, in response to the degree of damping of the yield stress fluid being observed to increase between successive measurements, that the initially static yield stress fluid has begun to flow. In one embodiment, the initially static yield stress fluid is determined to have begun to flow in response to the relative increase in the degree of damping being greater than a threshold. This approach provides advantages in that traditional flow meters are ineffective at such low speeds, particularly with a yield stress fluid, which may creep around such a traditional flow meter. The increase may be a substantial increase, such as an increase over a threshold. Preferably, the threshold is determined based on a known at-rest measurement or a previous measurement or measurements, such as a multiple of such measurements. Preferably, temperature of the yield stress fluid is measured and as part of decision making in the detection of the onset of flow, for example, by discounting viscosity changes brought on solely by change in temperature. In one embodiment, the initially static yield stress fluid is determined to have begun to flow in response to the relative increase in the degree of damping being greater than a threshold. Alternatively or additionally, the initially static yield stress fluid may be determined to have begun to flow in response to the change in the degree of damping being greater than a threshold. Preferably, a low-pass filtering is performed on the series of measurements prior to determining whether the initially static yield stress fluid has begun to flow, such as by obtaining a moving average from the series of measurements. Preferably, the degree of damping that is measured is a quantity proportional to the apparent viscosity, and may be the apparent viscosity itself. There is further provided a method of detecting a leak of a yield stress material from a system comprising any of the above described methods of detecting flow in a yield stress fluid that is initially static.

According to a further aspect of the invention, there is provided a method of estimating the yield stress of a yield stress fluid using one or more vibratory transducers, the method comprising: making a first measurement, V1, of the viscosity of the yield stress fluid at a first frequency of vibration; making a second measurement, V2, of the viscosity of the yield stress fluid at a second frequency of vibration that is different from the first frequency of vibration; and estimating the yield stress of the yield stress fluid based on a linear combination of V1 and V2. Preferably, the method further comprises performing a correction to one or more of V1 and V2 based on the first and second frequencies of vibration and the power law index of the yield stress fluid. More preferably, the method further comprises: making a third measurement, V3, of the viscosity of the yield stress fluid at a third frequency of vibration that is different from the first and second frequencies of vibration; and estimating the power law index of the yield stress fluid based on V3 and the third frequency of vibration and further based on one of: V1 and the first frequency of vibration; and V2 and the second frequency of vibration.

According to a further aspect of the invention, there is provided a method of estimating a flow velocity of a yield stress fluid using one or more vibratory transducers, the method comprising: making a first measurement, V1, of the viscosity of the yield stress fluid at a first frequency of vibration; making a second measurement, V2, of the viscosity of the yield stress fluid at a second frequency of vibration that is different from the first frequency of vibration; and estimating the flow velocity of the yield stress fluid as a function of the ratio of V1 and V2.

According to a further aspect of the invention, there is provided a method of estimating the yield stress of a yield stress fluid using one or more vibratory transducers, the method comprising: making, using a vibratory transducer, a first measurement, V1, of the viscosity of the yield stress fluid at a first frequency of vibration; making, using a vibratory transducer, a second measurement, V2, of the viscosity of the yield stress fluid at the first frequency of vibration while the flow of the yield stress fluid around the vibratory transducer is different relative to the flow around the vibratory transducer when making the first measurement; and estimating the yield stress of the yield stress fluid based on V1 and V2.

According to a further aspect of the invention, there is provided a method of estimating a fluid property of a yield stress fluid flowing in a conduit, the method comprising taking one or more viscosity measurements using one or more vibratory transducers, wherein one or more recesses or one or more ridges are provided on a vibrating surface of the one or more the vibratory transducers or are provided on an adjacent portion of the conduit wall.

Aspects of the invention may comprise making a measurement of the degree of damping of vibration by making a measurement of the Q factor of vibration. Aspects of the invention may alternatively, or additionally comprise obtaining the apparent viscosity of the yield stress fluid, preferably from the measured Q factor.

According to a further aspect of the invention, there is provided an apparatus for estimating the yield stress of a flowing yield stress fluid, the apparatus comprising: one or more vibratory transducers, each having a vibratory surface; a processing module configured to: vibrate a vibratory surface of one of the one or more vibratory transducers to transmit a wave from the vibrating surface into a viscoplastic boundary layer of a flowing yield stress fluid; make, using the vibrations of the vibratory transducer, one or more measurements of the degree of damping of vibration; and estimate the yield stress of the flowing yield stress fluid based on the one or more measurements of the degree of damping of vibration. Preferably, the apparatus is configured (or the processing module thereof is configured) to carry out any of the above-described methods.

According to a further aspect of the invention, there is provided An apparatus for estimating the yield stress of a flowing yield stress fluid using one or more vibratory transducers having a vibratory surface in contact with the yield stress fluid, the apparatus comprising: means for vibrating a vibratory surface of a vibratory transducer to transmit a wave from a vibrating surface into a viscoplastic boundary layer of the flowing yield stress fluid; means for making, using the vibrations of the vibratory transducer, one or more measurements of the degree of damping of vibration; and means for estimating the yield stress of the flowing yield stress fluid based on the one or more measurements of the degree of damping of vibration. Preferably, the apparatus comprises means for carrying out any of the above-described methods.

According to a further aspect of the invention, there is provided a non-transitory computer-readable medium having stored thereon instructions that, when executed by one or more processors, cause the one or more processors to: vibrate a vibratory surface of a vibratory transducer to transmit a wave from a vibrating surface into a viscoplastic boundary layer of a flowing yield stress fluid; make, using the vibrations of the vibratory transducer, one or more measurements of the degree of damping of vibration; and estimate the yield stress of the flowing yield stress fluid based on the one or more measurements of the degree of damping of vibration. Preferably, the computer-readable medium has stored thereon instructions for causing one or more processors to carry out one of the above-described methods.

Aspects of the invention relate to the measurement of one or more of the following properties of Newtonian and non-Newtonian fluids: yield stress, viscosity (at one or more equivalent shear rates), power law index n, consistency factor K, flow velocity, and the detection of onset of flow from initially static conditions. In addition, aspects of the invention may be applicable in both static and flowing conditions.

Aspects of the invention may be used in a wide range of settings, for example: as an in-line harsh process-tolerant device in pipes, vessels, open channels; for the taking of field measurements in marine and earth science environments; in the laboratory with continuous, automated or discrete sample measurements; as a portable device for both laboratory, field and at-line use; and as a component of a system incorporating measurement of these fluid properties including resonators based on micro-electro-mechanical systems (MEMS) and nano-electro-mechanical systems (NEMS) scale architectures.

Aspects of the invention are based on the use of one or more viscosity measurement transducers and the modulation of the rheological state of the fluid at the transducer measurement surface through one or more of the formation of a boundary layer as a result of fluid flow and the liquefaction of non-yielded solid material by vibrational agitation.

In some cases, aspects of the invention can be performed using a conventional viscometer design, such as rotational viscometers including rotational viscometers of the cone and plate type and the rotational cylinder type. Other conventional viscometer designs with which aspects of the invention may be performed include differential pressure viscometers and falling-ball-type viscometers. However, compared with traditional approaches to measuring yield stress, aspects of the invention may have particular application for the surface-loaded attributes of resonant viscometer transducers, especially such types which work by the formation and dissipation of a pure shear wave.

Compared with traditional approaches to measuring yield stress that for the most part require a captive static sample of fluid, aspects of the invention may have particular application in the continuous rheological measurement of materials in the flowing condition, while also being capable of use with static materials.

In particular, aspects of the invention may have application in the monitoring of yield stress or other fluid properties in-line in a process in which the yield stress and its variation is a value of interest, and further substances may be added in greater or lesser amounts according to the estimated yield stress of the fluid and any particular desired yield stress or other fluid property of the yield stress fluid.

BRIEF DESCRIPTION OF THE DRAWINGS

Aspects of the invention will be described in more detail by way of example only with reference to the accompanying drawings. Components within the drawings are not necessarily to scale, emphasis instead being placed upon clearly illustrating principles.

FIG. 13, a wave emanating from the surface of the transducer will firstly traverse the liquid region within the boundary layer, Ld, and therefore experience the liquid viscosity, $V_L$. Where the wave propagation depth is sufficiently long, the wave may reach the transitional region and thereby register the higher viscosity $V_T$ of the material in the transitional region;

FIG. 27 shows schematically an apparatus for carrying out one or more techniques of the present disclosure, wherein a viscosity transducer is pivotable from a first position perpendicular to the flow direction, to a second position rotated toward the flow direction;

FIG. 28 shows a transducer with a smooth profile in open flow of yield stress material;

FIG. 29 shows the transducer of FIG. 28 in a flow of yield stress material through a pipe or vessel;

FIG. 39 shows two further bob designs for a transducer in perspective and cross-sectional view;

FIG. 40 shows a further bob design for a transducer in perspective and cross-sectional view.

DETAILED DESCRIPTION

A yield stress fluid effectively behaves like a solid when shear stresses in the fluid are below the yield stress. This happens, for example, when the fluid is at rest or when a volume of fluid is moving with uniform velocity. When a flowing material possessing yield stress encounters a surface, a velocity gradient is developed in the region of material near the surface. This gradient leads to the formation of shear stresses within the fluid. Liquefied regions will form where these stresses exceed the yield stress of the material. The liquefied layer regions developing as a result of the velocity gradient in the material near the surface is the boundary layer (BL).

Figure 1:
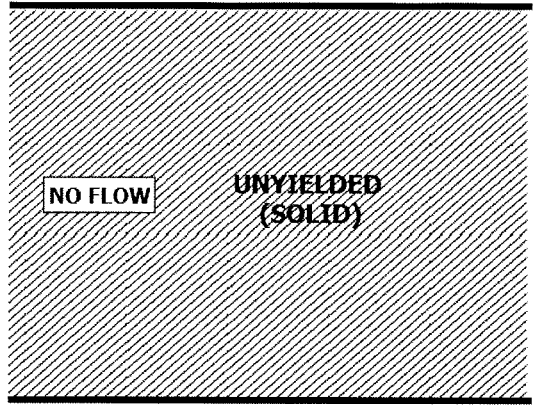
FIG. 1 is a cross-sectional view of a yield stress fluid in a pipe, wherein the fluid is at rest.

FIG. 1 shows a yield stress fluid in a pipe. There is no flow and so the fluid is at rest. Therefore there is no velocity gradient in the fluid and so it is unyielded, i.e. solid, at all locations.

Figure 2:
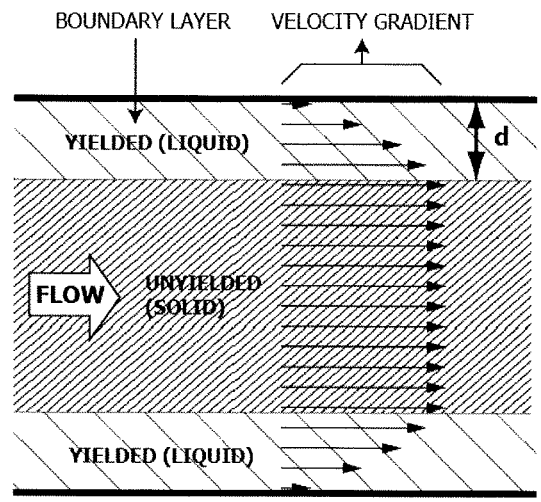
FIG. 2 is a cross-sectional view of a yield stress fluid in a pipe, wherein the fluid is flowing.

FIG. 2 shows a yield stress fluid undergoing flow in a pipe, where the solid material shears at the pipe wall forming a liquid layer. Due to friction and the velocity of the fluid relative to the pipe wall, there is a velocity gradient leading to yielded material, i.e. liquid, in a boundary layer adjacent the pipe wall. Further from the pipe wall, the velocity gradient decreases leading to a reduction in shear stress to below the yield stress, causing the flowing material to solidify. This flow is known as 'plug flow'.

The unyielded material is considered to be in the solid regime. The yielded material is considered to be in the liquid regime and to have a specific depth.

There is a reduction of apparent viscosity as the fluid liquefies. The transition from liquid to solid at the periphery of the boundary layer is complex and the subject of ongoing research. Material that may assist in understanding the present disclosure and the complex behaviour in the boundary layer of a yield stress material undergoing flow includes Boujlel et al "Boundary Layer In Pastes—Displacement Of A Long Object Through A Yield Stress Fluid" (Journal of Rheology, volume 56, 2012, doi:10.1122/1.4720387).

Without wishing to be bound by theory, it is believed that part or even all of the liquid layer could be considered a region of graded viscosity increasing rapidly into the solid zone.

The depth of the boundary layer, d, is found to be a function of flow velocity U but may also be affected by viscosity and yield stress.

Immersing wholly or at least partially a vibratory viscosity transducer into a fluid can enable viscosity and resonant frequency to be measured in real time.

Figure 3:
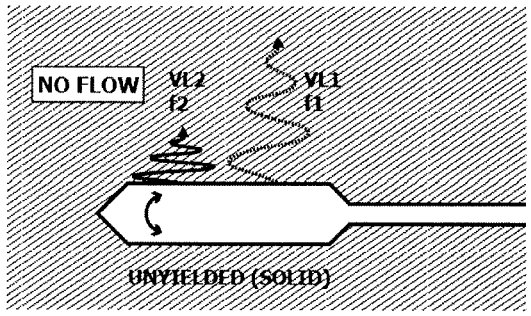
FIG. 3 is a cross-sectional view of a static yield stress fluid in which there is located a viscosity transducer in the form of a bob attached to a shaft, the transducer being operable at at least two frequencies, f1, f2.
Figure 4:
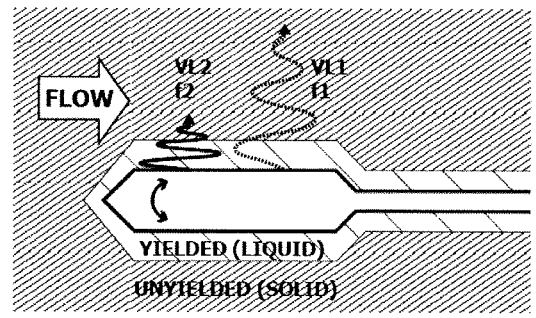
FIG. 4 is a cross-sectional view of a flowing yield stress fluid in which there is located a viscosity transducer in the form of a bob attached to a shaft, the transducer being operable at at least two frequencies, f1, f2.
Figure 5:
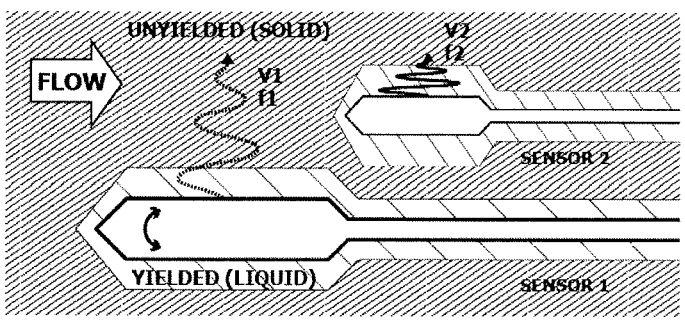
FIG. 5 is a cross-sectional view of a flowing yield stress fluid in which there is located a first viscosity transducer in the form of a bob attached to a shaft, the transducer being operable at a first frequencies, f1, and a second viscosity transducer in the form of a bob attached to a shaft, the transducer being operable at a second frequencies, f2.

FIGS. 3, 4 and 5 show by way of example a viscosity transducer in the form of a bob attached to a shaft, the arrangement located in a yield stress material and vibrating torsionally relative to a central longitudinal axis.

FIG. 3 shows that, with the material at rest, the environment around the transducer is such that there is no boundary layer—the material is wholly solid.

FIG. 4 shows that material undergoing flow will shear against the transducer surface causing the formation of a liquefied boundary layer.

The transducer is capable of operating at least two frequencies. A first frequency of operation may be relatively low, such as below 400 Hz. A second frequency of operation may be relatively high, such as above 1500 Hz. It is to be noted that these frequencies are by way of example only and that the invention may be put into effect using frequency ranges other than the examples set out here.

Vibration at each frequency produces a shear wave that will propagate in the boundary layer.

The higher frequency wave has a relatively short penetration depth, typically covering the most highly sheared liquefied region and relatively little, if any, of the solid regime. This results in a lower viscosity measurement and a lower mass loading at the transducer.

The lower frequency wave has a relatively long penetration depth, typically covering the most highly sheared liquefied region but also a greater portion of the solid regime, the particular amount being influenced by the boundary layer depth. Depending on the yield stress, the fluid will appear more solid at the lower frequency, resulting in a higher viscosity measurement and increased mass loading at the transducer.

By cancelling out the effect of the liquefied region to leave only the effect of the solid region that is influenced by boundary layer depth, an estimate of the yield stress can be made. In particular, an estimate of the yield stress can be made as a differential function of the viscous loss readings at the two frequencies.

Advantageously, this approach does not require many of the assumptions made by other approaches to determining a yield stress. For example, it is not imperative that the fluid obeys the Cox-Merz rule, whereby a steady-state shear viscosity at a given shear rate is approximated by the dynamic viscosity at the same frequency. The Cox-Merz rule is an empirical rule and applies only for certain non-Newtonian fluids. Due to not being reliant on the Cox-Merz rule, this approach has a wider application and is not limited to fluids for which the Cox-Merz rule is a valid approximation.

In addition, compared with existing approaches in which parameters are fit to fluid models such as the Herschel-Bulkley or Casson models, the yield stress representing the zero-shear-rate intercept, this approach reduces or eliminates variation due to thermal effects, noise, unsteady flow rate. This is consequence of the form of the solution as a differential function of the viscous loss readings—by subtracting one measurement from another, common-mode errors or variations are reduced or eliminated.

Viscosity of a yield stress fluid may be measured at two different vibrational (resonant) frequencies. For example, the two frequencies may be a relatively low frequency of 400 Hz and a relatively high frequency of 1500 Hz. This may be achieved with two single frequency viscometers in relatively close proximity to each other as shown in FIG. 5 or alternatively as a single device operating as a dual-frequency viscometer as shown in FIG. 4.

The viscosity transducer is not limited to the form shown in FIG. 4. In this example, the viscosity transducer comprises a bob attached to a shaft. The bob may take many geometric forms including, but not limited to, a cylinder, disc, or sphere.

Figure 6:
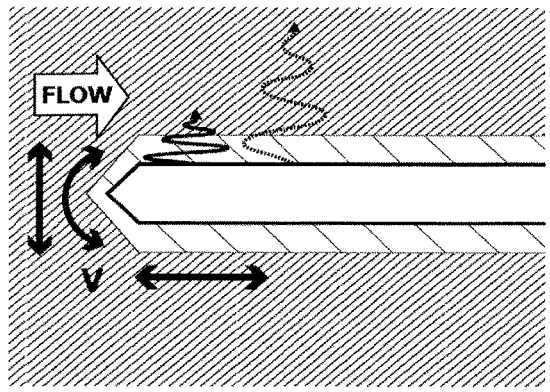
FIG. 6 is a cross-sectional view of a flowing yield stress fluid in which there is located a multiple-frequency rod resonator capable of vibrating in torsional, lateral and longitudinal modes.

FIG. 6 shows a multiple-frequency rod resonator capable of vibrating in torsional, lateral and longitudinal modes. Such a device may act as a dual-frequency viscometer by selecting two modes having different resonant frequencies.

Figure 7:
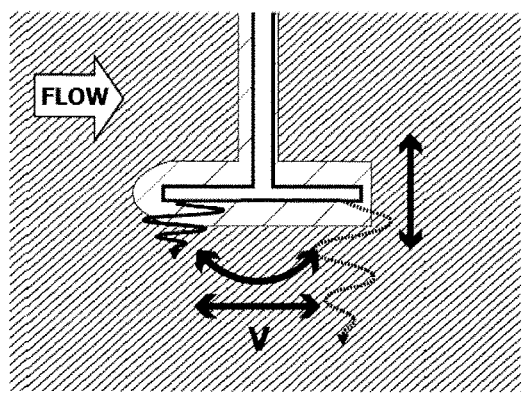
FIG. 7 is a cross-sectional view of a flowing yield stress fluid in which there is located a multiple-frequency disc resonator capable of vibrating in torsional, lateral and longitudinal modes, the axis of the disc being perpendicular to the flow direction.

FIG. 7 shows a multiple-frequency disc resonator capable of vibrating in torsional, lateral and longitudinal modes. Such a device may act as a dual-frequency viscometer by selecting two modes having different resonant frequencies.

In such cases the viscosity transducers are preferably configured to vibrate in a torsional mode but lateral and longitudinal modes of vibration can also be used.

Alternatively the transducer may be the actual fluid container as in the case of a resonant tube device or a vibrating vessel of any shape.

Figure 8:
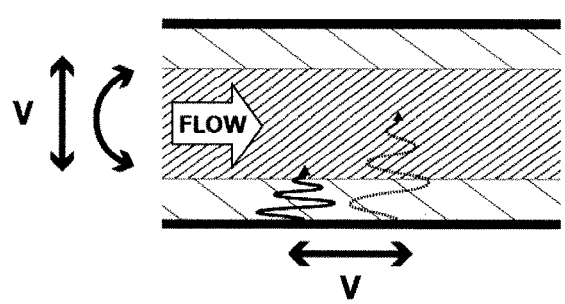
FIG. 8 is a cross-sectional view of a flowing yield stress fluid in a vibrating tube viscometer that is capable of vibrating in torsional, lateral and longitudinal modes.

FIG. 8 shows a vibrating tube viscometer capable of vibrating in torsional, lateral and longitudinal modes.

Figure 9:
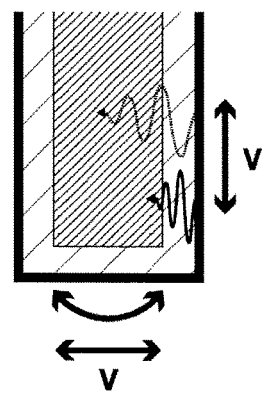
FIG. 9 is a cross-sectional view of a yield stress fluid a vibrating vessel viscometer that is capable of vibrating in torsional, lateral and longitudinal modes.

FIG. 9 shows a vibrating vessel viscometer capable of vibrating in torsional, lateral and longitudinal modes.

As before, the viscosity transducers are preferably configured to vibrate in a torsional mode but lateral and longitudinal modes of vibration can also be used.

Figure 10:
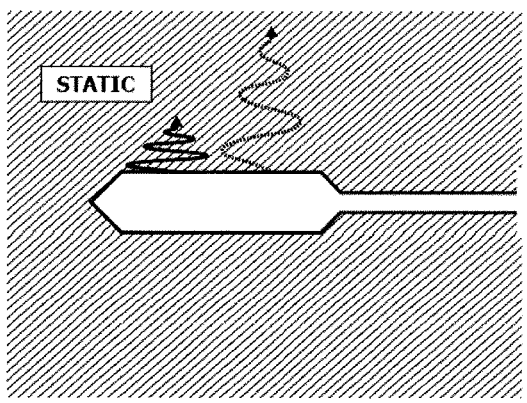
FIG. 10 is a cross-sectional view of a static yield stress fluid in which there is located a viscosity transducer in the form of a bob attached to a shaft, wherein no boundary later forms.
Figure 11:
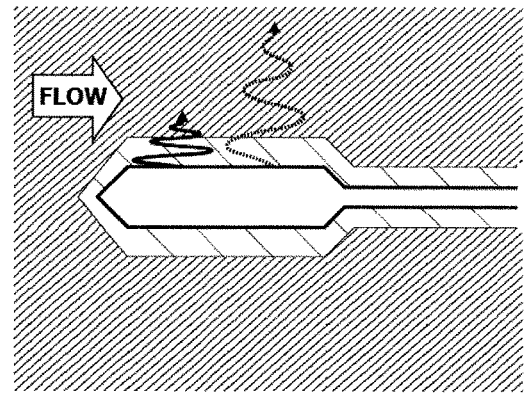
FIG. 11 is a cross-sectional view of a flowing yield stress fluid in which there is located a viscosity transducer in the form of a bob attached to a shaft, wherein a boundary later forms around the viscosity transducer.

Using the bob-and-shaft-type resonator as an example, but applicable to all cases: in the absence of an additional liquefaction vibration source, under non-flowing conditions the transducer will effectively detect a solid material as shown in FIG. 10 and, when the material flows, a liquid boundary layer region will form as shown in FIG. 11.

In the drawings of FIGS. 3 to 11, the boundary layer is seen as a clearly marked zone (broadly spaced hatching aligned top-left to bottom-right) against the solid material (more narrowly spaced hatching aligned top-right to bottom-left).

However, without wishing to be bound by theory, it is believed that the boundary layer is more complex than this, and particularly that it is a region where a highly liquid region graduates towards a solid region, with a mixture of both liquid and solid elements in a transitional region lying between the solid and highly liquid regions.

Some previously published models refer to a two-state nature of the boundary layer as 'bi-viscous'. Once again, without wishing to be bound by theory, it is believed that the change from liquid to solid is better modelled by three separate viscosity zones, liquid, transitional and solid, because it is believed that bi-viscous models do not easily accommodate a non-sudden change of state from liquid to solid across the boundary layer.

The use of three separate viscosity zones is presented for the first time in this disclosure and is termed a 'tri-viscous' model of the boundary layer.

Figure 12:
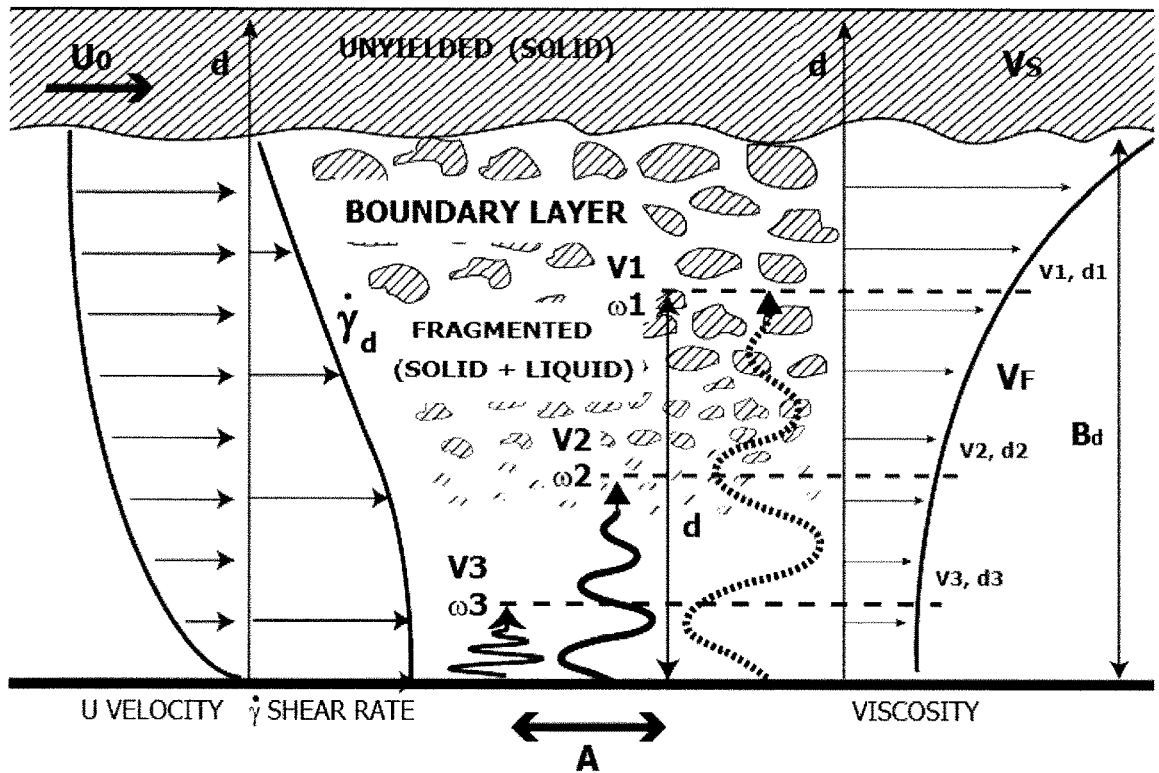
FIG. 12 illustrates the tri-viscous model by showing a yield stress fluid flowing past a multi-frequency resonator surface and forming a boundary layer, in which shear forces due to the flow of yield stress material break up the solid plug, forming a graded zone from solid to liquid across the boundary layer.

FIG. 12 illustrates the tri-viscous model by showing a yield stress fluid flowing past a multi-frequency resonator surface and forming a boundary layer, in which shear forces due to the flow of yield stress material break up the solid plug, forming a graded zone from solid to liquid across the boundary layer. Three shear waves are shown. The lowest frequency wave of angular frequency $\omega 1$ penetrates furthest into the boundary layer. The highest frequency wave of angular frequency $\omega 3$ remains close to the resonator surface. The intermediate frequency wave of angular frequency $\omega 2$ penetrates to a distance somewhere in-between the lowest and highest frequency waves.

With reference to FIG. 12, the bulk of the material flows with a velocity $U_0$ and a velocity profile is formed, the velocity local to the surface having a maximum value of $U_0$ outside the boundary layer and falling to zero at the resonator surface.

The velocity profile gives rise to a shear rate profile, with the shear rate varying from a maximum at the surface to zero outside the boundary layer.

At very low or zero shear rate the material remains a solid with an apparent viscosity, $V_s$.

As the shear rate increases, some of the solid material yields, leading to a fragmented dispersion of solid material. This fragmented dispersion of solid material frustrates the propagation of the shear wave leading to a high apparent fluid viscosity, $V_F$, as shown in the viscosity profile of viscosity vs distance from the transducer surface. This leads to a transitional viscosity region, $V_T$.

At higher shear rates, more of the solid material yields causing a reduction in the fragmented dispersion of solid material and the material increasingly behaves as a liquid, easing wave propagation and leading to a reduction in apparent viscosity $V_F$ to the apparent liquid viscosity, $V_L$.

The increased apparent viscosity of $V_T$ is a result of the corruption of the homogeneity of the liquid layer by fragmentation nearing the boundary layer. $V_T$ has a higher value than $V_L$, or even $V_s$, as the propagation path of the wave through the fragments of solid material that are dispersed in liquid is more dissipative than through a homogeneous liquid or solid.

Figure 13:
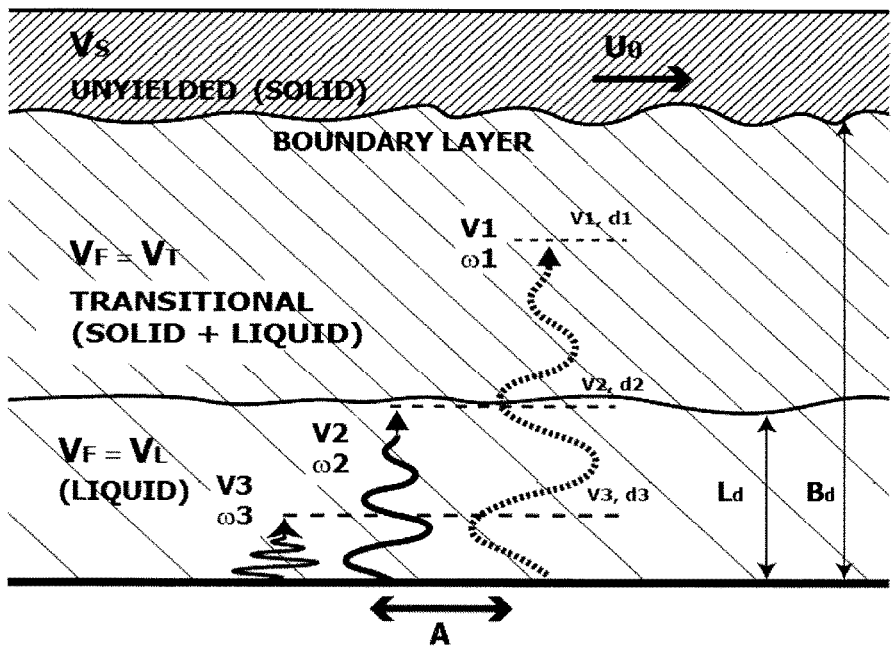
FIG. 13 shows, a wave emanating from the surface of the transducer that will firstly traverse the liquid region within the boundary layer, Ld, and therefore experience the liquid viscosity, $V_L$. Where the wave propagation depth is sufficiently long, the wave may reach the transitional region and thereby register the higher viscosity $V_T$ of the material in the transitional region.

FIG. 13 shows the tri-viscous model more clearly, without illustrating the fragmentary nature of the transitional region.

The tri-viscous model can be used to estimate the yield stress of a material.

According the Herschel-Bulkley model, $$\sigma = \sigma_0 + K\gamma^n, \quad (1)$$

in which $\sigma$ represents the shear stress, $\sigma_0$ represents the yield stress, K is a fluid-dependent parameter termed the 'consistency', $\gamma$ represents the shear rate, and n is a fluid-dependent parameter termed the 'power law index'.

Dividing equation (1) by the shear rate $\gamma$ results in:

$$\frac{\sigma}{\gamma} = \frac{\sigma_0}{\gamma} + K\gamma^{n-1}, \quad (2)$$

Looking at the sources of the shear rate, it has two components:

$$\gamma = \gamma_F + \gamma_\omega, \quad (3)$$

where $\gamma_F$ is the shear rate due to the bulk fluid flow and $\gamma_\omega$ is the shear rate due to vibration of the resonator.

By definition, the apparent fluid viscosity $V_F$ is the ratio of shear stress and shear rate. Writing equation (2) in terms of $V_F$: results in $$V_F = V_{YS} + V_L, \quad (4)$$

where a portion $V_{YS}$ of the apparent viscosity $V_F$ is due to the yield stress and a portion $V_L$ is due to the liquefied material. In the case of viscosity due to yield stress, the viscous wave dissipation is a function of the inhomogeneity caused by shear flow, and so $\gamma = \gamma_F$ $$V_{YS} = \frac{\sigma_0}{\gamma} = \frac{\sigma_0}{\gamma_F}, \quad (5)$$

In the case of resonant viscosity measurements, $\gamma_\omega$ is significantly greater than $\gamma_F$ and so $\gamma \to \gamma_F$. Applying the Cox-Merz rule, $\gamma \to \gamma_F \to \omega$. Therefore the apparent viscosity of liquefied material $V_L$ is given by $$V_L = K\omega^{n-1} \quad (6)$$

Combining equations 4, 5, and 6 results in an expression for the apparent fluid viscosity in terms of the yield stress, shear rate due to flow, consistency, frequency and power law index:

$$V_F = \frac{\sigma_0}{\gamma_F} + K\omega^{n-1} \quad (7)$$

The shear rate due to flow $\gamma_F$ is a function of depth and other parameters, and can be defined in terms of a shear rate at the surface, $\gamma_0$, and a depth function $f(d/B_d)$ as $$\gamma_F = \gamma_0 / f(d/B_d) \quad (8)$$

where the depth function is a somewhat arbitrary function developed to provide an expected variation in shear rate across the boundary layer, given by:

$$f(d/B_d) = (1 - (d/B_d)^R)^{-1} \quad (9)$$

where d is the wave propagation depth, Bd is the boundary layer depth, and R is a fluid-dependent shear rate index.

This leads to $$V_F = \frac{\sigma_0}{\gamma_0} f(d/B_d) + V_L(\omega). \quad (10)$$

A shear wave propagating from the resonant viscometer will dissipate to a skin depth a distance d from the surface. The propagation depth in a viscoelastic fluid varies with the loss tangent $\tan(\delta)$ of the material. But, for illustration, the simpler Newtonian interpretation of this distance may be used, in which the skin depth is given by:

$$d = \sqrt{\frac{2V}{\omega\rho}} \quad (11)$$

where $\rho$ is the fluid density.

According to equation (11), within a given viscosity-density regime, the propagation depth can be assumed relatively constant for a given frequency.

With reference to FIG. 13, a wave emanating from the surface of the transducer will firstly traverse the liquid region within the boundary layer, Ld, and therefore experience the liquid viscosity, $V_L$. Where the wave propagation depth is sufficiently long, the wave may reach the transitional region and thereby register the higher viscosity $V_T$ of the material in the transitional region.

Two waves may be configured to emanate from the surface of the transducer at different frequencies, $\omega 1$ and $\omega 2$. The relatively low frequency wave at angular frequency $\omega 1$ propagates further than the relatively high frequency wave at angular frequency $\omega 2$. The frequencies are selected such that the low frequency wave experiences the viscosity of the transitional region $V_T$ at a penetration distance $d_1$ that is greater than the depth Ld of the liquid region in the boundary layer and the high frequency wave has a short penetration depth $d_2$ and typically covers only the highly sheared, liquefied region in the boundary layer.

From equation (10), $$V1 = V_F = \frac{\sigma_0}{\gamma_0} f(d_1/B_d) + V_L(\omega 1). \quad (12)$$

In normal conditions, d (wave propagation depth), Bd (boundary layer depth), and R (fluid-dependent shear rate index) and $\gamma_0$ (shear rate at surface) can be considered relatively constant, and so equation (12) simplifies to $$V1 = \alpha\sigma_0 + V_L(\omega 1) \quad (13)$$

for some empirical value $\alpha$.

In the case of the high frequency wave, the measured viscosity V2 will mostly represent the liquid-only viscosity, according to which equation (10) simplifies to:

$$V2 = V_L(\omega 2). \quad (14)$$

In the liquid region, the viscosity will vary with shear rate and therefore the liquid-region viscosity of the low frequency wave $V_L(\omega 1)$ will not equal liquid-region viscosity of the high frequency wave $V_L(\omega 2)$. But, $V_L(\omega 1)$ can be related to $V_L(\omega 2)$ via the power law equation using the power law index n, according to which:

$$V_L(\omega 1) = V_L(\omega 2)\left(\frac{\omega 1}{\omega 2}\right)^{n-1}. \quad (15)$$

Substituting equation (14) into equation (15) leads to $$V_L(\omega 1) = V2\left(\frac{\omega 1}{\omega 2}\right)^{n-1}. \quad (16)$$

Substituting equation (16) into equation (13) leads to $$V1 = \alpha\sigma_0 + V2\left(\frac{\omega 1}{\omega 2}\right)^{n-1}. \quad (17)$$

Rearranging leads to an expression for yield stress of the fluid given by $$\sigma_0 = \alpha'\left(V1 - V2\left(\frac{\omega 1}{\omega 2}\right)^{n-1}\right), \quad (18)$$

where V1 is the measured viscosity at frequency $\omega 1$, V2 is the measured viscosity at frequency $\omega 2$, n is the power law index and $\alpha'$ is an empirical scaling constant determined by, for example, calibration with a test sample.

For known and fixed frequencies $\omega 1$ and $\omega 2$, the yield stress can even be written as the linear combination of V1 and V2 according to the expression $$\sigma_0 = \alpha' V1 + \alpha'' V2 \quad (19)$$

in which $\alpha'$ and $\alpha''$ are each empirical values. In fact, equation (19) is a generalized case of equation (18).

The ratio of $\alpha''$ to $\alpha'$ is given by the expression:

$$-\left(\frac{\omega 1}{\omega 2}\right)^{n-1}. \quad (20)$$

Estimating the yield stress of a material using equation (18) requires a value to be supplied for the power law index n of the fluid. For many materials, predetermined values of the power law index n are available. For example, n is usually taken to be 0.5 for molten chocolate.

Figure 14:
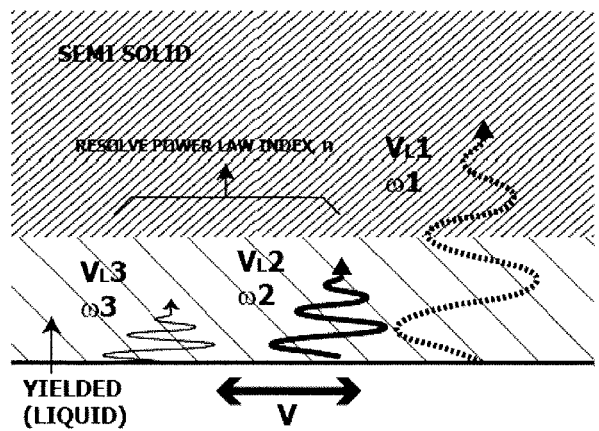
FIG. 14 shows an alternative configuration in which a third wave is generated by way of a third measurement at a third frequency.

FIG. 14 shows an alternative configuration in which the value of n can be obtained as a real-time measurement by using a viscosity measurement at a third frequency $\omega 3$ that is higher than $\omega 2$. If $\omega 2$ is 1500 Hz, $\omega 3$ might be 5 kHz, say.

Both $\omega 2$ and $\omega 3$ are chosen to have sufficiently high frequency values that they will have a propagation depth lower than the liquid depth Ld. The propagating waves will then only experience the liquefied state within the layer. Therefore $V2 = V_L(\omega 2)$ and $V3 = V_L(\omega 2)$.

For the purpose of determining n, the yield stress can be ignored and we use the power law expression in equitation (15) to obtain a relationship between V2, V3, $\omega 2$, $\omega 3$, and n:

$$V2 = V3\left(\frac{\omega 2}{\omega 3}\right)^{n-1}, \quad (21)$$

which can be rearranged to obtain n by the expression:

$$n = \frac{\log(V2/V3)}{\log(\omega 2/\omega 3)} + 1 \quad (22)$$

Once a value of n is obtained, it can be applied in, for example, equation (18) to estimate the yield stress.

The shear rate at the surface $\gamma_0$ has been found to vary as a function of flow velocity $U_0$ and boundary layer depth $B_d$ as follows:

$$\gamma_0 = \frac{\beta' \cdot U_0}{B_d} \quad (23)$$

where $\beta'$ is an empirical constant

Inserting equation (23) into equation (12), V1 can be seen as a function of flow velocity $U_0$ by way of the following expression:

$$V1 = V_F = \sigma_0(B_d/\beta' U_0)f(d_1/B_d) + V_L(\omega 1). \quad (23A)$$

According to this expression, V1 increases with decreasing flow rate. By contrast, V2, in equation (14) is not seen to vary with flow rate.

Therefore, by dividing one viscosity by the other. i.e. by obtaining , VR=V2/V1, an estimate of flow velocity, $U_0$ is obtained.

$$U_0 = \frac{VR \cdot kA}{kB - kC \cdot VR} \quad (24)$$

where kA, kB and kC are empirically determined calibration parameters.

While the expression for determining a yield stress in equation (18) provides advantages in that it is a closed-form analytical expression that allows the value to be computed directly, this is not the only possible approach to calculating yield stress.

For example, equation (1) representing the Herschel-Bulkley model can be rewritten as $$\sigma_0 = \sigma - K\gamma^n, \quad (25)$$

The shear stress $\sigma$ for a given shear rate $\gamma$ is a function of viscosity as follows:

$$\sigma = V_L \cdot \delta, \quad (26)$$

Shear rate can be derived from the viscometer frequency of vibration using the Cox-Merz rule, where shear rate is directly equivalent to the angular frequency $\omega$. Thus combining equations (25) and (26) results in:

$$\sigma_0 = V_L \cdot \omega - K\omega^n \quad (27)$$

Taking viscosity and frequency readings from two resonant viscometers or a single multi-mode device leads to the simultaneous equations (assuming the power law index n is known):

$$\sigma_0 = V_L(\omega 1) \cdot \omega 1 - K\omega 1^n$$

$$\sigma_0 = V_L(\omega 2) \cdot \omega 2 - K\omega 2^n \quad (28)$$

These equations can be solved to find the yield stress $\sigma_0$ and the consistency K. If n is unknown, three simultaneous equations can be formed.

Under the Casson model:

$$\sigma^{0.5} = \sigma_0^{0.5} + (PV \cdot \gamma)^{0.5}, \quad (29)$$

where $\sigma$ is the shear stress, $\sigma$ is the shear rate, $\sigma_0$ is the yield stress and PV is the plastic viscosity. Applying the Cox-Merz rule as before leads to the following simultaneous equations (assuming power law index n is known):

$$\sigma_0^{0.5} = (V_L(\omega 1) \cdot \omega 1)^{0.5} - (PV \cdot \omega 1)^{0.5},$$

$$\sigma_0^{0.5} = (V_L(\omega 2) \cdot \omega 2)^{0.5} - (PV \cdot \omega 2)^{0.5}, \quad (30)$$

which can be solved to give estimates of the yield stress and plastic viscosity.

Other models of viscosity are known and this approach to finding the model parameters such as yield stress via viscosity measurements at multiple frequencies is not limited to the Herschel-Bulkley and Casson model examples presented here.

The yield stress can alternatively be obtained, using equations (18), (28) or (30) for example, without requiring a viscometer capable of vibrating (e.g. resonating) at multiple frequencies. Instead, two transducers may be located relatively close to each other in the yield stress material to eliminate or minimize the effect of any spatial variation in properties of the yield stress material such as any spatial variation of temperature of spatial variation of composition (e.g. concentration). The transducers are configured to vibrate at their own particular frequencies that are different from one another.

A measurement at a third frequency of operation, higher still than the first and second frequencies of operation, such as at 5 kHz or more, can provide other advantages. In particular, the higher third frequency generates a shear wave in the yield stress material with an even shorter penetration depth than the shear wave of the second (i.e. middle) frequency. This frequency shear wave will encounter much the same liquid region as the second (i.e. middle) frequency shear wave, but at a higher shear rate. In this case, the second and third frequency shear waves will largely penetrate only the highly liquid boundary layer space without any dominating yield stress effect because neither shear wave penetrates the solid region to any great extent. Therefore these frequency measurements can be used to calculate power law parameters for the material using, equation (22) for example.

Estimating the yield stress of a yield stress material can also be performed with a single measurement frequency of vibration, whereby a long propagating wave responds to yield stress variations without requiring a second wave at a second frequency of vibration. The flow can be modulated to induce change between solid and liquid states. These changes can then be correlated with the response of a single-frequency vibrator viscometer.

The flow modulation or modification can be performed by pump speed modulation, flow diversion, constriction modulation by a valve, stop start flow, stirrer/agitator, local vibrator device, transducer displacement in the fluid, vessel displacement, eccentric stirring.

Local flow changes can be induced by modulating the spatial position of: the viscometer body orientation to the flow, the viscometer relative to nearby surface, a local flow obstructer, and the fluid container/pipe/vessel.

Figure 15:
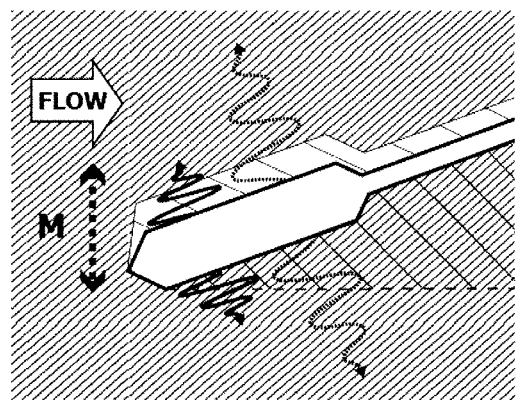
FIG. 15 shows flow modulation by varying the viscometer body orientation to the flow.

FIG. 15 shows flow modulation by viscometer body orientation to the flow. Depending on the orientation, a greater or lesser portion of the material adjacent to the transducer will be sheltered from the flow by the transducer, affecting the amount viscosity readings. By taking viscosity measurements when at more than one orientation, the yield stress may be estimated using equation (18) above and setting $\omega 1 = \omega 2$.

Other approaches may estimate the yield stress using equation (28) or equation (30).

For example, a change in flow velocity at a viscometer will likely result in change in viscosity measurement. It has been found that the yield stress of the fluid affects the degree to which the viscosity changes as a result of the change in flow velocity.

Thus many empirical models can be fit to calibrate data accounting for the change in viscosity as a result of a change in flow velocity (as measured by, for example, a flow meter).

For example, it has been found that the yield stress can be estimated based on the change in viscosity resulting from a change in flow velocity by evaluating the following expression:

$$\sigma_0 = (\Delta V \cdot K_0 \cdot (U_1^{-K_1} - U_2^{-K_1})^{-1})^{K_2}, \qquad (30A)$$

where $U_1$ and $U_2$ are the flow velocities, $\Delta V$ is the change in viscosity arising from the change in flow velocity, and $K_0$, $K_1$, and $K_2$ are empirical constants, which can be found by a standard calibration process.

The change in flow velocity is not limited to temporal changes in flow velocity. For example, the flow velocity can be a changed as a result of a change in location of the viscometer. Alternatively, two viscometers can be located in different locations. The two viscometers may encounter different flow velocities, for example, as a result of different pipe widths. The expression of equation (30A) may still be applicable and provide an estimate of the yield stress. Such an embodiment may be of particular advantage when multiple viscometers are available but limited to the same single resonant mode (resonant frequency). Such a program may have advantages in terms of economy of manufacture, particularly for MEMS and NEMS applications.

The invention is of course not limited to such a precise formula and other formula may be readily determined based on the principle of changing the flow around a viscometer between frequency and viscosity measurements.

Figure 16:
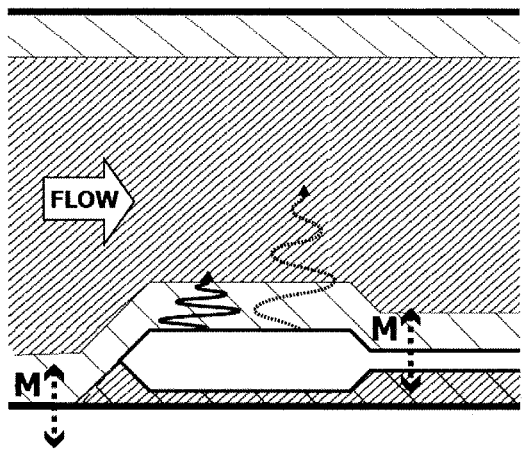
FIG. 16 shows flow modulation by viscometer position relative to a nearby surface. Either or both of the surface and transducer can move.

FIG. 16 shows flow modulation by viscometer position relative to a nearby surface. Either or both of the surface and transducer can move. The distance from the boundary layer at the nearby surface affects the boundary layer around the transducer. By modulating the distance and continuing to take viscosity measurements, the yield stress may be determined.

Figure 17:
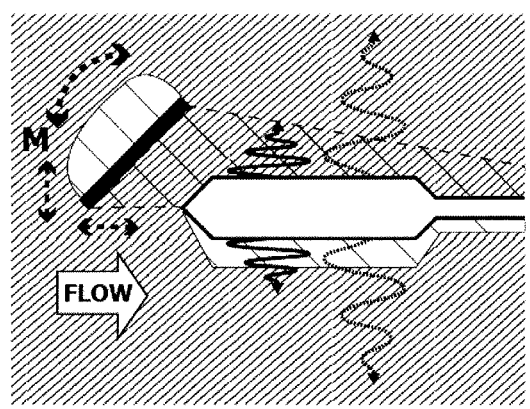
FIG. 17 shows flow modulation by a local flow obstructer.

FIG. 17 shows flow modulation by a local flow obstructer. Upstream of the transducer an obstruction changes position, which may include a change of orientation, relative to the transducer causing varying amounts of sheltering on the transducer. By modulating the position of the obstruction and continuing to take viscosity measurements, the yield stress may be determined. The movement of other obstructions may also affect the flow around the transducer. For example, movement of an obstruction downstream of the transducer may also affect flow around the transducer; what is important is that the obstruction has an effect on the flow around the transducer. For example, the obstruction may be in a vicinity of the transducer.

Figure 18:
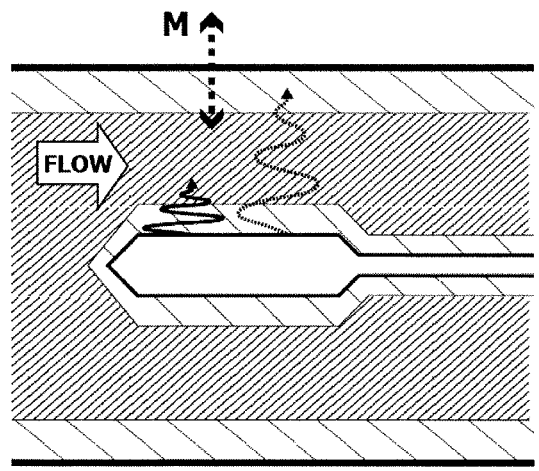
FIG. 18 shows flow modulation by modulating a container position.

FIG. 18 shows flow modulation by modulating a container position, the container being the container in which the yield stress material is held along with the transducer.

Another approach to achieving flow modulation may be through vortex shedding, either by the transducer itself or by an obstruction upstream of the transducer. Vortex shedding provides an oscillating flow whereby vortices are created on the downstream side of the vortex shedding body, the vortices detaching periodically from either side of the body.

In these cases, the alteration of flow gives rise to a change of boundary layer formation and therefore presents different solid/liquid areas to the viscometer measurement region. This causes the measured viscosity to vary accordingly and the variation of viscosity can be scaled to yield stress. For example, in the case of a fluid with no yield stress, modulation of the flow will make little or no difference to the measured viscosity Liquefaction may also have application in the determining of a yield stress or other fluid property of a yield stress fluid. Some yield stress fluids, and particularly those having the form of a granular suspension, can reduce their apparent yield stress when exposed to vibrations at a high enough frequency and a high enough amplitude. By this principle, air is commonly removed from wet concrete. The wet concrete is vibrated to cause a reduction in its yield stress allowing air bubbles trapped in the semi-solid matrix of the wet concrete to be released. Borrowing terminology from seismology, the inventors describe this process in yield stress materials as 'liquefaction'.

An investigation into the liquefying effect of sufficiently strong oscillations in a yield stress material that may be helpful in understanding the present disclosure may be found in Balmforth et al "The Viscoplastic Stokes Layer" (Journal of Non-Newtonian Fluid Mechanics, volume 158, 2009, doi:10.1016/j.jnnfm.2008.07.008). Other material that may assist may be found in Vavreck "Flow Of Molten Milk Chocolate From An Efflux Viscometer Under Vibration At Various Frequencies And Displacements" (International Journal of Food Science & Technology, volume 39, 2004, doi:10.1111/j.1365-2621.2004.00805.x).

Vibration sources of an appropriate amplitude and frequency may be applied locally to the yield stress material surrounding the viscometer transducer to create liquefaction. This may be performed in flowing or static conditions.

Yield stress change is detected by either the reduction in the apparent viscosity or a change in frequency due to a change in mass loading at the transducer surface.

The vibration source may be the resonance of the transducer itself as used to make a viscosity measurement and in the context of the present disclosure, this is termed 'intrinsic stimulation'. Alternatively it may be a separate vibration.

The combination of high frequency and high amplitude of vibration may cause local liquefaction at and around the transducer surface, detected as a viscosity and frequency change. Modulation of transducer vibration may be managed by control electronics, which may also allow the simultaneous measurement of viscous loss and resonator frequency. The method can be used with either a single transducer operating at one frequency, multiple transducers with different operating frequencies, or a multi-frequency resonator unit, i.e. a vibratory transducer having a plurality of resonant modes and being capable of resonating at multiple frequencies.

Alternatively, or additionally, the vibration to create the liquefaction can be a different mode than the vibration to make the viscosity measurement. For example, it can be a second torsional mode, or it can be a lateral or longitudinal vibrational mode of the transducer.

Figure 19:
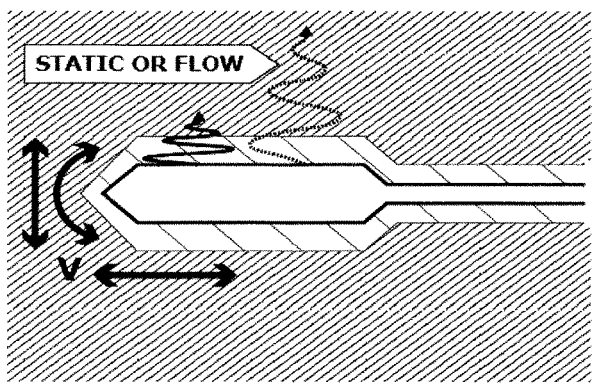
FIG. 19 illustrates liquefaction by intrinsic vibration, with example lateral, longitudinal and torsional vibrational modes shown.

FIG. 19 illustrates liquefaction by intrinsic vibration. If the yield stress material is stationary, then there is no flow, and the only liquefied region of the yield stress material is that produced by the vibrations of the transducer. If the yield stress material is flowing around the transducer, then a boundary layer develops naturally as a result of the velocity gradients generated by the presence of the transducer. A portion of the liquefied region around the transducer will be due to the boundary layer and a portion of the liquefied region around the transducer will be due to the liquefaction.

Alternatively, or additionally, a liquefaction vibration source may be external to the vibrating viscometer (or viscometers in the case where multiple viscometers are used). In the context of the present disclosure, this is termed 'extrinsic stimulation'.

The liquefaction vibration source may comprise one or more mechanical vibration devices connected to the vessel or one or more acoustic vibration sources mounted on or near the transducer or transducers, at a location offset from the transducer or transducers within the vessel, at the vessel wall or, where a free surface is present such as in the case of open-channel flow, above the free surface of the fluid.

Figure 20:
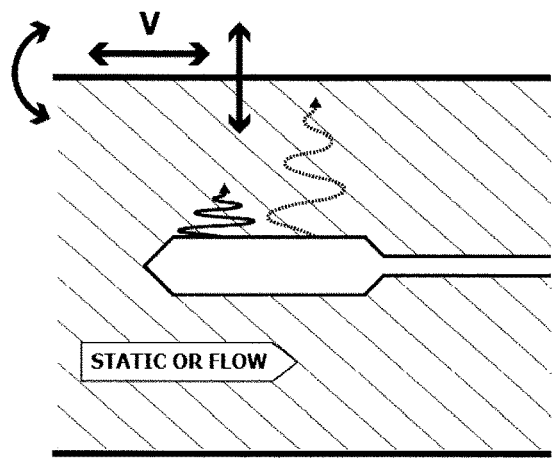
FIG. 20 illustrates liquefaction by extrinsic vibration, the vibration being provided at a vessel or conduit wall, with example lateral, longitudinal and torsional vibrational modes shown.

FIG. 20 illustrates liquefaction by extrinsic vibration, whereby vibration to cause liquefaction is applied to a wall of the vessel or conduit in which the yield stress material is located.

Figure 21:
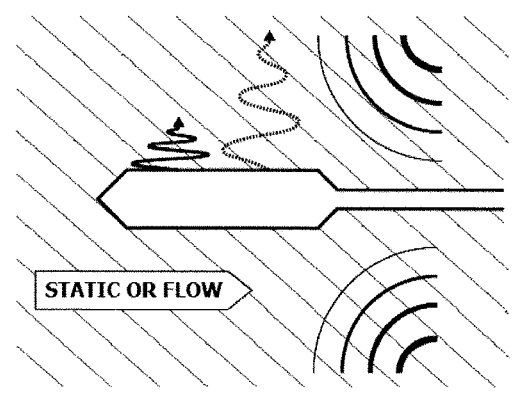
FIG. 21 illustrates liquefaction by extrinsic vibration, whereby vibration to cause liquefaction is provided by vibration sources located elsewhere in the yield stress material.

FIG. 21 illustrates liquefaction by extrinsic vibration, whereby vibration to cause liquefaction is provided by vibration sources located elsewhere in the yield stress material.

As with intrinsic stimulation, the combination of a relatively high frequency and amplitude of vibration by the liquefaction vibration source causes liquefaction near the transducer surface and is detected as a viscosity and frequency change. Modulation of transducer vibration may be managed by control electronics according to the desired protocol of use, such as with a single transducer at a single frequency, multiple transducers, or a multi-frequency unit.

It is noted that extrinsic stimulation has previously been combined with conventional rotational viscometers for static materials in captive samples but not with a resonant viscometer. A particular advantage is provided by the use of a resonant viscometer with which the frequency change due to different mass loading of the resonant transducer has particular significance.

It is noted that the liquefaction techniques described above are particularly effective with yield stress materials that are granular suspensions rather than gel-like materials. Further background on such materials may be found in Hanotin et al "Viscoelasticity Of Vibrated Granular Suspensions" (Journal of Rheology, volume 59, 2015, doi:10.1122/1.4904421).

Knowledge of the boundary layer may be used to provide improved techniques and apparatus for estimating fluid properties such as the yield stress, such as by manipulating the flow to change the boundary layer in the area around a viscosity transducer.

A boundary layer will usually form where a yield stress fluid with a velocity makes contact with a surface. The presentation of any surface to a flowing yield stress fluid dictates the formation of solid and liquid regions in the fluid. Promoting regions of substantial flow will result in higher velocity gradients and greater proportion of regions in which the shear stresses are greater than the yield stress, and thus result in liquefied regions. Where there is low or zero flow, the velocity gradients in the fluid will be low or zero, leading to regions where the shear stresses are below the yield stress and therefore solid regions.

Manipulation of flow may favourably create high shear regions or low shear regions—known as 'dead zones'—in the path of propagating waves. This may improve the viscous and mass loading response of the resonant viscometer(s) to changes in fluid rheology. Solid regions close to the transducer will present the material better for liquefaction while also amplifying the influence of yield stress on the measurements of the low frequency viscometer.

Local flow modification can arise from recesses or protrusions such as ridges in the transducer or container geometry or by introducing obstructions or diversions to create regions sheltered from the flow—'flow shadows'—leading to areas of low or zero shear stress and the formation of solid regions.

By creating contours or by altering the relative proximity of surfaces it is possible to modify the flow to deliberately develop areas of 'solid', 'transitional' and 'liquid' material in the environment in which waves are propagated and thereby influence the yield stress measurement. For example, this may improve the sensitivity of the yield stress measurement.

In particular, by promoting the formation of solid regions at or close to the surface of the transducer, shear waves propagating from the surface of the transducer may encounter solid regions and transitional regions closer to the surface of the transducer, increasing sensitivity to the solid and transitional regions, from which the yield stress is determined. Since the propagation depth of the shear wave decreases with increasing frequency, this may allow the transducer to vibrate at higher frequencies while still propagating through solid regions. This may be particularly advantageous in that a greater choice in transducers is provided if the sensitivity to solid regions can be 'tuned' in this way. Alternatively, it may be desirable to avoid certain frequency bands due to, for example, plant noise, but still obtain a sensitivity to solid regions equivalent or similar to a transducer operating in a restricted band.

Detecting the onset of flow is important in many applications. In many measurement environments it is desirous to be able to detect the onset of flow, i.e. the point at which static material begins to flow. One particularly important application may be the detection of the flow developing as a result of a slow leak in a system.

However, it can be difficult to achieve this using conventional flow measurement techniques which are typically not sensitive to flow at rates close to zero. This is particularly the case with yield stress materials, which may appear solid and unmoving but may be undergoing a very slow or creeping flow.

Without wishing to be bound by theory, it is believed that, since a yield stress fluid requires a liquid boundary layer in order to flow, an incipient liquid layer will form at the very outset and this liquid is manifestly detectable as a sudden change in viscosity from the vibratory viscosity transducer.

In particular, if the viscosity in a static sample of a yield stress material is monitored using a vibratory viscosity transducer, the measured viscosity will be observed to increase substantially from the value at static conditions as the yield stress material begins to flow, before decreasing to below the value at static conditions as flow rate increases beyond a barely perceptible creeping flow.

The technique is found to be sensitive, responding to the mere application of pressure to a yield stress fluid.

Following this principle, it is possible to determine when a yield stress material fluid is no longer static, in that it has begun to creep slowly, by detection of an increase in apparent viscosity (i.e. damping), using a vibratory viscometer in a yield stress material.

Thus there is provided a technique for determining movement that would otherwise be considered imperceptible.

Figure 22:
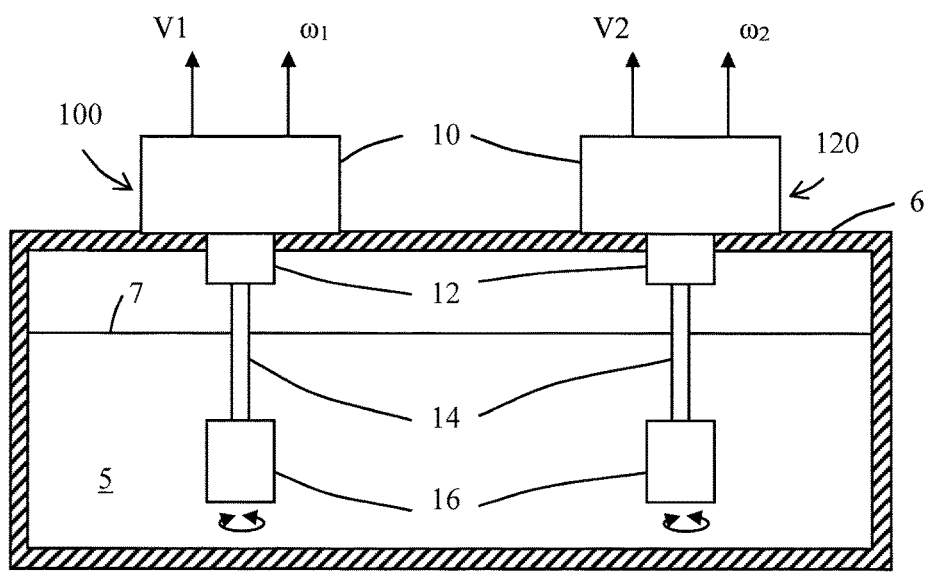
FIG. 22 shows schematically an apparatus for carrying out one or more techniques of the present disclosure.

FIG. 22 illustrates schematically an example apparatus for analysing a fluid using one or more techniques of this disclosure. The apparatus comprises a first resonant viscosity transducer 100 and a second resonant viscosity transducer 120 located in relatively close proximity to the first resonant viscosity transducer in a fluid sample 5. The fluid sample 5 in this instance is a fixed volume of generally stationary fluid in a chamber 6, the fluid having a free surface 7, and portions of the viscosity transducers piercing the free surface 7 from above.

While the chamber 6 is drawn in FIG. 22 having a closed top wall, as may be necessary if its contents are pressurized, the chamber may equally be open from above. The fluid sample may therefore be at atmospheric pressure. In such a configuration, the viscosity transducers may be located above the chamber 7 such that at least portions of the transducers extend into the upper opening of the chamber 7 and contact the fluid sample 5 instead.

The resonant viscosity transducers are of a type described in U.S. Pat. No. 6,450,013, in which the transducers include a vibrating element configured to oscillate in a torsional mode. The vibrating element is immersed in the fluid and the viscosity is determined by correlation with the damping experienced by the element, i.e. the Q factor. In particular, each transducer comprises a transducer mounting 10, a semi-rigid connection member 12, a shaft 14 and a sense element 16. The shaft 14 and the sense element 16 are driven to vibrate torsionally with an angular frequency ω. The sense element 16 and the shaft 14 and sense element 16 are formed, at least substantially and possibly entirely, of a metal material such as a stainless steel. The sense element 16 and shaft 14 both have a circular cross-section, i.e. they are circularly symmetrical about the axis of oscillatory rotation. An example transducer that may be suitable for determining the viscosity via vibration at a frequency is the XL7 model viscometer manufactured by Hydramotion Ltd of Malton, UK.

The contents of the chamber 6 are pressurized to 10 Bar relative to atmospheric pressure. The sensing element is exposed to the viscous effect of the fluid in the sample 5. Increasing viscosity of the fluid causes an increased damping of the vibration in the transducer, resulting in a measurable reduced vibrational efficiency of the system.

In this apparatus, the first viscosity transducer 100 is specially designed, via choice of stiffness and mass or moment of inertia of the resonant system, to have a low resonant frequency at 400 Hz, i.e. an angular frequency of approximately 2513 rad/s. The second viscosity transducer 120 is specially designed to have a higher resonant frequency at 1500 Hz, i.e. an angular frequency of approximately 9425 rad/s.

To determine the viscosity at the resonant frequencies of the first and second viscosity transducers, the 'Q factor' of the vibration can be determined. The Q factor is a dimensionless parameter that indicates the level of damping of a resonator, wherein the level of damping is a function of the viscosity. In particular, it indicates the degree to which a resonator is underdamped. On a plot of frequency response, a high Q factor provides a high and narrow peak at the resonant frequency whereas a low Q factor provides a low and wide peak. Due to the change in width of the peak with damping, the Q factor can be defined as the ratio of the resonant frequency to the resonant bandwidth:

$$Q = \frac{\omega_R}{\Delta\omega}$$

wherein $\omega_R$ is the resonant frequency in radians per second and $\Delta\omega$ is the Full Width at Half Maximum (FWHM), the bandwidth over which the power of the vibration is greater than half of the maximum (or equivalently the amplitude of vibration is greater than the maximum amplitude at resonance divided by $\sqrt{2}$), i.e. the bandwidth between the 3 dB points. The fluid viscosity is inversely proportional to the square of the Q factor and any constant of proportionality needed to compute the value of the viscosity measurement can be obtained by calibration with reference fluids of known viscosity.

It should be noted that the measurement of viscosity at or corresponding to a frequency of vibration may comprise making amplitude measurements at more than one frequency to estimate the Q factor but a single viscosity measurement is obtained at a frequency corresponding to the or a resonant frequency. For example, the bandwidth can be determined based on the frequencies required to cause the amplitude to drop to a factor of $1/\sqrt{2}$ of the maximum amplitude at resonance. As a non-limiting example, the frequencies required to cause the amplitude to drop to a factor of $1/\sqrt{2}$ of the maximum amplitude at resonance may be determined by performing a frequency sweep around the resonant frequency, but the skilled reader will recognize that the 3 dB point frequencies can be identified by various other techniques.

Another approach to determining the Q factor is to measure the amplitude of vibration at a series of frequencies around the resonant frequency and fit a parabola by the method of least squares to the frequency and amplitude values (or logarithms thereof). The 3 dB points can then be obtained as solutions to a quadratic equation based on the parabola of best fit to the measurements.

Another approach to determining the Q factor is by logarithmic decrement. By ceasing to drive the transducer and measuring the decay of vibrations, the Q factor may be determined by monitoring time series of the vibrations and determining the natural logarithm of the ratio of two successive peaks, $A_1$ and $A_2$, by the following expression:

$$Q = \frac{1}{2}\sqrt{1 + \left(\frac{2\pi}{\ln\left(\frac{A_1}{A_2}\right)}\right)^2}.$$

The first and second viscosity transducers 100, 120 both provide viscosity measurements corresponding to their resonant frequencies. The first and second viscosity measurements V1, V2, and first and second angular frequencies $\omega_1$, $\omega_2$ are provided to a processing module (not shown) which processes these measurements to provide an estimate of the yield stress using equation (18) above, i.e. evaluating $$\sigma_0 = \alpha'\left(V1 - V2\left(\frac{\omega 1}{\omega 2}\right)^{n-1}\right)$$

using a known value of n, the power law index, and a previously obtained empirical scaling constant $\alpha'$.

Figure 23:
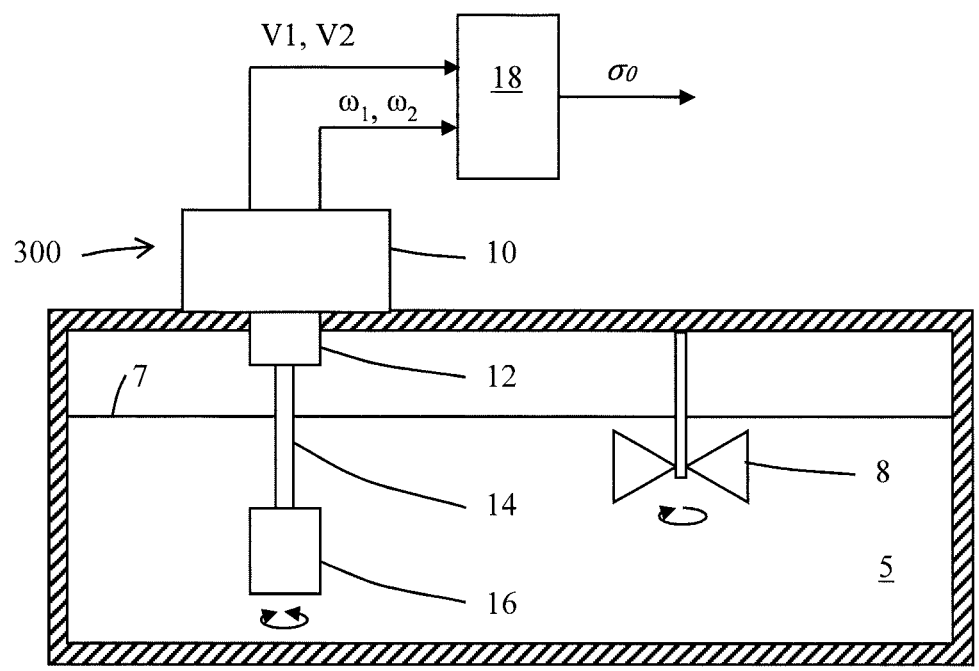
FIG. 23 shows schematically an apparatus for carrying out one or more techniques of the present disclosure.

FIG. 23 illustrates schematically a further example apparatus for analysing a fluid using one or more techniques of this disclosure. The apparatus comprises a single resonant viscosity transducer 300 that has been specially designed to be able to operate at two different frequencies, 400 Hz and 1500 Hz, i.e. angular frequencies of approximately 2513 rad/s and 9425 rad/s, as with the apparatus shown in FIG. 22. Such a transducer may be obtained by choice of stiffness and mass or moment of inertia for each of the elements of the transducer such that it has at least two resonant modes corresponding to the desired frequencies. The fluid sample 5 in this instance is a fixed volume of fluid in a chamber 6, the fluid having a free surface 7, and a portion of the viscosity transducer 300 piercing the free surface 7 from above. In contrast with the example shown in FIG. 22, the chamber 6 is provided with a paddle stirrer 8 which continuously agitates the fluid sample 5 such that the fluid is flowing past the immersed portion of the viscosity transducer 300.

The first and second viscosity measurements V1, V2, and first and second frequencies $\omega_1$, $\omega_2$ are provided to a processing module 18 which processes these measurements by evaluating equation (18) above using a known value of the power law index to provide an estimate of the yield stress $\sigma_0$.

Figure 24:
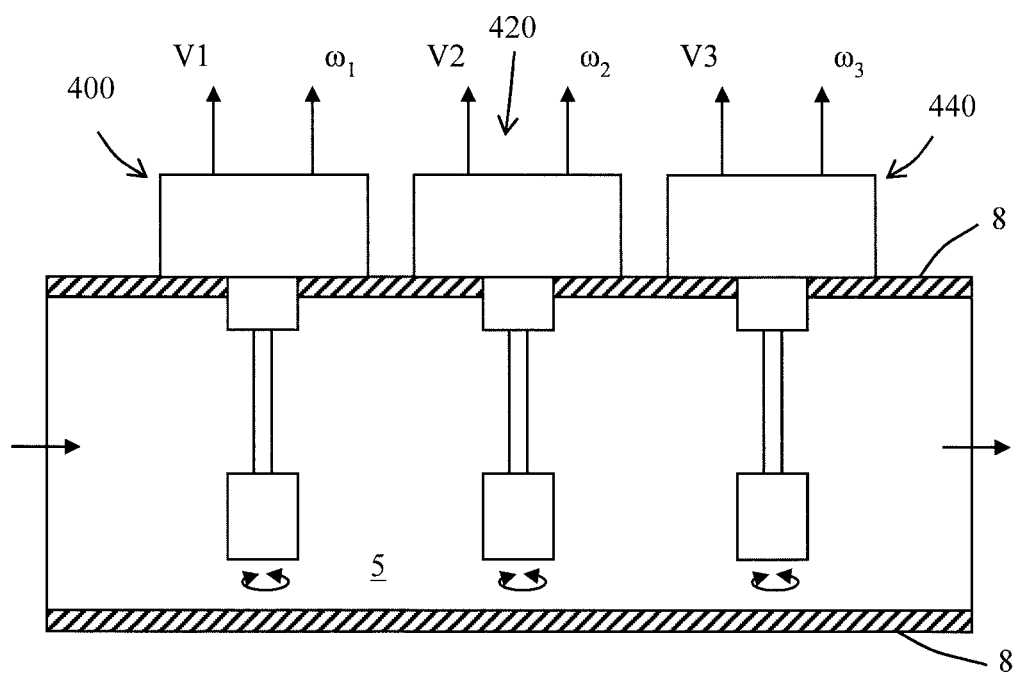
FIG. 24 shows schematically an apparatus for carrying out one or more techniques of the present disclosure.

FIG. 24 illustrates schematically a further example apparatus for analysing a fluid using one or more techniques of this disclosure, in which multiple resonant viscosity transducers 400, 420, 440 each vibrate at increasingly higher frequencies corresponding to their respective resonant frequencies. It will be appreciated that the ordering of the transducers in increasing resonant frequency is not essential and they may be in any arbitrary order. In this instance, the resonant frequencies are 400 Hz, 1500 Hz and 5000 Hz, i.e. angular frequencies of approximately 2513 rad/s, 9425 rad/s and 31416 rad/s. The fluid sample 5 in this instance is a flowing in a conduit 7 at an upstream average speed of 1 m/s. The viscosity transducers 400, 420, 440 extend from above through the wall of the conduit 7, the portions extending through the wall of the conduit 7 being in contact with the fluid sample as it flows past the viscosity transducers 400, 420, 440.

The first, second and third viscosity measurements V1, V2, V3 and first and second frequencies $\omega_1$, $\omega_2$, $\omega_3$ are provided to a processing module (not shown) which processes these measurements to provide estimates of one or more fluid properties.

The processing module evaluates the power law index n from the measured V2, V3, $\omega_2$, and $\omega_3$ by substitution into equation (22) above, i.e.:

$$n = \frac{\log(V2/V3)}{\log(\omega 2/\omega 3)} + 1$$

Once the power law index is known, the yield stress can be evaluated using equation (18) above and V1, V2, $\omega_1$, and $\omega_2$, i.e.

$$\sigma_0 = \alpha'\left(V1 - V2\left(\frac{\omega 1}{\omega 2}\right)^{n-1}\right)$$

Figure 25:
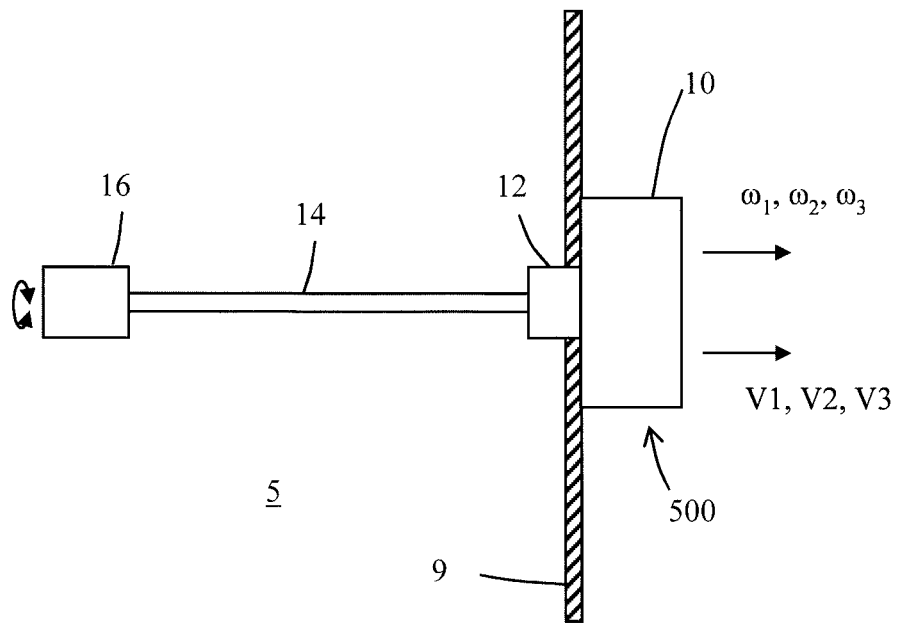
FIG. 25 shows schematically an apparatus for carrying out one or more techniques of the present disclosure.

FIG. 25 illustrates schematically a further example apparatus for analysing a fluid using one or more techniques of this disclosure. The apparatus includes a single resonant viscosity transducer 500 that has been specifically designed to be able to operate at multiple frequencies: 400 Hz, 1500 Hz and 5000 Hz as per the embodiment shown in FIG. 24, i.e. angular frequencies of approximately 2513 rad/s, 9425 rad/s and 31416 rad/s. Such a transducer may be obtained by choice of stiffness and mass or moment of inertia for each of the elements of the transducer such that it has at least two resonant modes corresponding to the desired frequencies. The viscosity transducer 500 is mounted horizontally through the side wall 9 of a chamber and the portion extending through the side wall is immersed in the fluid sample 5. The viscosity transducer 500 has a particularly long shaft 14 such that the sense element 16 is spaced a particularly long distance from the walls 9 of the chamber.

The first, second and third viscosity measurements V1, V2, V3, and first and second frequencies $\omega_1$, $\omega_2$, $\omega_3$ are provided to a processing module (not shown) which processes these measurements to provide estimates of one or more fluid properties.

As with the embodiment shown in FIG. 24, the processing module evaluates the power law index n and yield stress $\sigma_0$ from the measured V1, V2, V3, $\omega_1$, $\omega_2$, and $\omega_3$ by substituting these values into equations (22) and (18) in turn.

Figure 26:
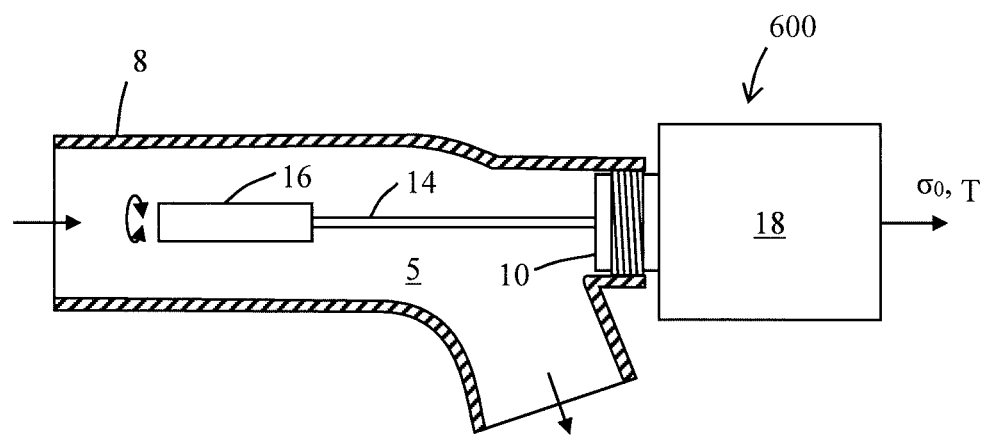
FIG. 26 shows schematically an apparatus for carrying out one or more techniques of the present disclosure.

FIG. 26 illustrates a variant apparatus for analysing a fluid using one or more techniques of this disclosure, in which multiple resonant viscosity transducers 400, 420, 440 each vibrate at increasingly higher frequencies corresponding to their respective resonant frequencies. The apparatus includes a single resonant viscosity transducer 600 that has been specifically designed to be able to operate at two frequencies: 400 Hz and 1500 Hz as per the second embodiment shown in FIG. 23, i.e. angular frequencies of approximately 2513 rad/s and 9425 rad/s. Such a transducer may be obtained by choice of stiffness and mass or moment of inertia for each of the elements of the transducer such that it has at least two resonant modes corresponding to the desired frequencies.

The viscosity transducer 600 comprises a sense element 16 on a shaft 14 extending from a threaded transducer mount 10. A processing module 18 is shown on the other side of the threaded transducer mount 10. The threaded portion of the transducer mount 10 engages with corresponding threads of a conduit 8. The sense element 16 and shaft extend along the axis of the conduit 8 facing upstream. The fluid-contacting portions of the viscosity transducer are formed of stainless steel (type 316) to resist corrosion and avoid contamination of the fluid. The conduit 8 includes a corner such that the fluid is diverted by the conduit walls to one side after it has passed the sense element 16 of the transducer 600, i.e. the viscosity transducer 600 is installed in an elbow section of the conduit 8.

The processing module 18 outputs the yield stress $\sigma_0$, and the fluid temperature. The fluid temperature is obtained from a temperature sensor included in the sense element 16 of the viscosity transducer 600. The yield stress $\sigma_0$ is obtained from the measured V1, V2, $\omega_1$, and $\omega_2$ by substitution into equation (18) as above.

In the examples shown in FIGS. 22 to 26, the fluid is variously at rest, in motion in a chamber, stirred by a paddle, and flowing in a conduit. It will be recognized that all of the example apparatus may be used in any of such fluid environments. For example, while FIG. 24 illustrates fluid flowing in a conduit past three separate viscosity transducers, these could be replaced by the single multimode viscosity transducer in FIG. 25 or any of the viscosity transducer arrangements in FIGS. 22 and 23, or some combination of multimode and single mode transducers.

The variant apparatus of FIG. 26 could equally have been included in any of the configurations of FIGS. 22 to 25, where the pipe fitting may be replaced with a more suitable means of attachment for extending through a bulkhead or conduit wall.

Alternatively, the above-described techniques may be implemented using another type of viscosity transducer, such as a vibrating-tube-type viscosity transducer. An example of a suitable transducer of this type is described in WO 2017001861 A1.

FIG. 27A shows a viscosity transducer 700 of the shaft-and-bob type comprising a shaft 714 and a bob 716 extending from a conduit wall 718 into the path of flowing yield stress fluid 5. The viscosity transducer 700 includes a pivot means 712 and is capable varying the orientation of the shaft 714 and bob 716 in the fluid 5.

In FIG. 27A, the shaft is aligned perpendicular to the direction of flow. In this configuration, a viscosity V1 and an angular frequency $\omega 1$ is obtained by torsional vibration of the shaft 714 and bob 716.

In FIG. 27B, the shaft 714 and bob 716 are rotated about pivot means 712 into the flow by an angle $\theta$ and a viscosity measurement is made at this orientation, leading to a viscosity V2 and an angular frequency $\omega 2$.

From these measurements, the yield stress of the fluid may be estimated using one of the approaches described in this disclosure, such as one of equations (18), (28) and (30).

Liquefaction may be introduced to liquefy regions of the yield stress material through the application of vibrations of sufficient amplitude and frequency.

In an embodiment, a single-frequency vibratory transducer is driven at its resonant frequency and the viscosity signal derived from shear losses is measured. Liquefaction is frequency-dependent and favours higher frequency so the frequency of vibration in this case may be of the order of 2 kHz but the invention is not limited to this frequency.

The liquefying vibration can be the actual vibration used for measurement, or any other torsional, lateral or longitudinal mode of vibration of the viscometer or the viscometer body.

In the case where the vibration is also the measurement mode, the amplitude A of vibration is modulated from a very low level, sufficient for measurement but not liquefaction and the value then recorded. Where there material has yield stress, increasing the amplitude will lead to local liquefaction nearest the surface of the resonator which may be detected in two ways.

In a first approach, a change in measured viscosity as the liquid layer is formed, $\Delta V_{AMP}$. Typically this is a reduction in viscosity as the apparent high viscosity of a semi-solid matrix is broken down. In other cases, where the yield stress material has a more gel-like matrix, the impedance to the measuring wave may increase as a lossy liquid is formed and the viscous loss may actually increase. The viscous loss change is then scaled ($k_{LV}$) against wave (resonator) amplitude to provide an estimate of yield stress.

A viscometer is driven at a first amplitude $A_A$, sufficient to liquefy the yield stress material, leading to measurements of viscosity $V_A$ and resonant frequency $F_A$. The viscometer is then driven at a second, lower, amplitude $A_B$, leading to measurements of viscosity $V_B$ and resonant frequency $F_B$. This leads to 'delta' values of $\Delta A = A_A - A_B$, $\Delta V_{AMP} = V_A - V_B$, and $\Delta F = F_A - F_B$, representing the step change in amplitude and the resulting changes in viscosity and frequency. An empirical estimate of the yield stress can be made by way of the following expression:

$$\sigma_0 = \Delta V_{AMP} k_{LV} / \Delta A \tag{31}$$

In a second approach, that may be implemented as an alternative or in addition to the first (i.e. viscosity change) approach, there may be an increase in frequency F as the more liquefied layer presents a lower mass loading $m_F$ than the solid structure $$F = \frac{1}{2\pi} \sqrt{K_v / (m_0 + m_F)} \tag{32}$$

in which $K_v$ and $m_0$ are stiffness and mass parameters of the mechanical vibrating system.

The frequency change $\Delta F_{AMP}$ is then scaled ($k_{LF}$) against the wave (resonator) amplitude to provide an estimate of yield stress by the following expression.

$$\sigma_0 = \Delta F_{AMP} k_{LF}/\Delta A \tag{33}$$

In an embodiment, vibration at a second (lower) frequency is additionally employed which does not contribute to liquefaction. This provides a reference signal to ratiometrically reduce or eliminate systematic errors caused by temperature or changes in fluid viscosity. By dividing by the viscosity or frequency measurements corresponding to a lower frequency (which has negligible liquefaction effect) errors which might be caused by the natural common mode changes of temperature or viscosity in the fluid are reduced or eliminated.

In particular, a vibratory viscometer is driven at a first resonant mode at a first amplitude $A_A$, sufficient to liquefy the yield stress material, leading to measurements of viscosity $V_{A-HIGH}$ and resonant frequency $F_{A-HIGH}$. The viscometer is then driven at the first resonant mode at a second, lower, amplitude $A_B$, leading to measurements of viscosity $V_{B-HIGH}$ and resonant frequency $F_{B-HIGH}$. This leads to a 'delta' value of $\Delta A = A_A - A_B$, representing the step change in amplitude.

A second vibratory viscometer is also driven at a at a second resonant mode (corresponding to a resonant frequency lower than at the first resonant mode) at an amplitude insufficient to cause liquefaction (e.g. $A_A$), leading to measurements of viscosity $V_{A-LOW}$ and/or resonant frequency $F_{A-LOW}$. The viscometer is then driven at the first resonant mode at an amplitude insufficient to cause liquefaction (e.g. $A_A$), leading to measurements of viscosity $V_{B-LOW}$ and/or resonant frequency $F_{B-Low}$.

Alternatively, a single multi-mode viscometer can be used to take all of the measurements.

In the case of viscosity, the viscosity ratio change $\Delta V_{RL}$, may then be scaled ($k_{LRL}$) against change in drive amplitude to provide an improved estimate of yield stress in which common mode errors, such as errors due to temperature change, are reduced or eliminated:

$$\Delta V_{RL} = V_{A-HIGH}/V_{A-LOW} - V_{B-HIGH}/V_{B-LOW}$$

$$\sigma_0 = \Delta V_{RL} \cdot k_{LRL}/\Delta A \tag{34}$$

Alternatively or additionally, for frequency, the frequency ratio change $\Delta F_{RL}$ may then be scaled ($k_{LRF}$) against change in drive amplitude to provide an improved estimate of yield stress:

$$\Delta F_{RL} = F_{A-HIGH}/F_{A-LOW} - F_{B-HIGH}/F_{B-LOW}$$

$$\sigma_0 = \Delta F_{RL} k_{LRF}/\Delta A \tag{35}$$

It is noted that, according to the techniques of the present disclosure, the frequency may be measured as an intermediate or accompanying step in the process of measuring the viscosity of the yield stress material. For example, identifying a Q-factor may require the resonant frequency to be identified. On the other hand, the resonant frequencies might be determined without also measuring viscosities.

Alternatively, it is not required that the viscometers (transducers) vibrate at resonance, particularly in the case where a change in viscosity is used to estimate the yield stress. For example, a viscometer may operate at a frequency or frequencies away from a resonant mode, such as a lower frequency, and obtain measurements of viscosity. In such cases away from resonance, frequency-based Q-factor approaches such as using bandwidth to determine a Q-factor and from the Q-factor a viscosity, may not be appropriate. It may be more appropriate to determine viscosity based on time-series approaches such as the log-decrement method or by a consideration of drag forces.

In such cases, the yield stress may be estimated by vibrating a vibratory transducer in the yield stress fluid at a first frequency and making a first measurement of the viscosity; providing a vibration to liquefy at least a portion of the yield stress fluid around the one or more vibratory transducers; while said portion of the yield stress material is liquefied, vibrating a vibratory transducer the first frequency and making a second measurement of the viscosity; estimating the yield stress of the yield stress fluid based on the first and second measurements of viscosity. The vibration to liquefy yield stress fluid around the one or more transducers is provided by the making of the second measurement at an increased amplitude of vibration relative to the first measurement. The yield stress may be estimated based on the difference between the first and second measurements of the viscosity scaled by the difference in amplitude between the first and second measurements such as by equation (31).

In another embodiment, a vibratory transducer is vibrated at a second frequency in the yield stress fluid and a third measurement is made of the viscosity, the second frequency being lower than the first frequency, and a vibratory transducer is vibrated at the second frequency in the yield stress fluid and a fourth measurement is made of the viscosity, wherein the yield stress is estimated based on difference between the first viscosity measurement scaled by the third viscosity measurement and the second viscosity measurement scaled by the fourth viscosity measurement, scaled by the difference in amplitude between the first and second measurements.

It may not be necessary to take separate third and fourth measurements as they may be the same—it is believed that amplitude of vibration has little effect on viscosity or resonant frequency provided the amplitude (or amplitude-frequency product) is sufficiently low that liquefaction does not occur.

For improved reduction in temporal fluctuations, the third and fourth measurements of viscosity or frequency may be made simultaneously with the first and second measurements respectively, in the case of a multi-frequency (e.g. multi-mode) viscometer, or immediately before or immediately after.

The invention is not limited to step changes in amplitude. In other embodiments, one or more step variations may be employed, including a series of gradual variations such as with an amplitude sweep, or periodic variation of amplitude according to sine waves, triangle waves, sawtooth waves, square waves or other periodic (or even aperiodic) signals. These changes may be detected as viscosity and/or frequency changes accordingly.

The source of vibration to liquefy the yield stress fluid around the viscometer is not required to originate from the viscometer.

FIG. 20 shows external mechanical vibration of structure coupled to fluid in any of torsional, lateral and longitudinal modes. Independent to the viscometer, the vibration may be provided by mechanical stimulation of the container or infrastructure surrounding the fluid as shown in FIG. 20.

Alternatively, or additionally, fluid-borne acoustic vibration can be the liquefying source as shown in FIG. 21.

In all cases the amplitude and frequency of these source can be controlled and modulated and the same measurements made as described above in respect of yield stress measurement from intrinsic liquefaction.

Alternatively, the above-described techniques are not limited to a particular type of vibrating transducer and may be implemented using a shaft-and-bob-type transducer or another type of vibrating transducer, such as a vibrating-tube-type viscosity transducer. An example of a suitable transducer of this type is described in WO 2017001861 A1.

FIGS. 28 to 33 show variations of this approach with viscosity transducers of the bob-and-shaft type, with the shaft axially aligned with the direction of flow, the bob facing upstream.

FIG. 28 shows a transducer with a smooth profile in open flow of yield stress material. The profile of the bob is rectangular in cross-section (i.e. cylindrical due to symmetry about axis), its width (i.e. diameter) reducing steadily to a point at its conical upstream end and its width (i.e. diameter) reducing steadily to the narrower width of the shaft at its frustro-conical downstream end. A boundary layer develops around the transducer, and thus waves propagating in the yield stress material from the transducer enter a liquid region followed by a solid region.

FIG. 29 shows the transducer of FIG. 28 in a flow of yield stress material through a pipe or vessel, the walls of the pipe or vessel being axially aligned with the flow direction and the shaft of the transducer, wherein a further boundary layer develops at the walls of the pipe or vessel. Therefore waves propagating in the yield stress material from the transducer enter a liquid region followed by a solid region followed by a further liquid region at the walls of the pipe or vessel.

Figure 30:
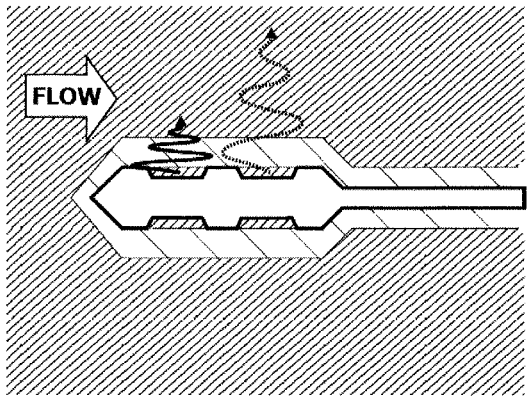
FIG. 30 shows a transducer with a contoured profile in an open flow of yield stress material.

FIG. 30 shows a transducer with a contoured profile in an open flow of yield stress material. The transducer is different from the transducer of FIG. 28 in that the rectangular (i.e. cylindrical) portion of the bob is provided with recesses, which are circumferential grooves in this case. Material in the recesses is sheltered from the flow and low shear stresses are generated within the recesses, with the result that the material in the recesses remains solid. A liquid boundary layer develops around the transducer but does not extend into the recesses. Therefore waves propagating in the yield stress material from the transducer enter a solid region in the recesses followed by a liquid region in the boundary layer at the transducer away from the recesses, followed by a further solid region in the open flowing yield stress material.

Figure 31:
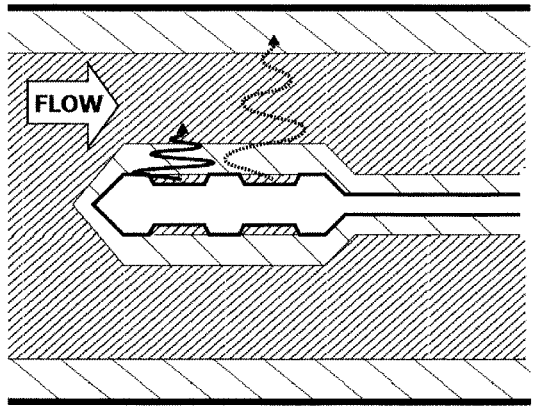
FIG. 31 shows the transducer of FIG. 30 with a contoured profile in a flow of yield stress material through a pipe or vessel.

FIG. 31 shows the transducer of FIG. 30 with a contoured profile in a flow of yield stress material through a pipe or vessel, wherein a further boundary layer develops at the walls of the pipe or vessel. Therefore waves propagating in the yield stress material from the transducer enter a solid region in the recesses of the transducer followed by a liquid region in the boundary layer at the transducer away from the recesses followed by a solid region followed by a further liquid region at the walls of the pipe or vessel.

Figure 32:
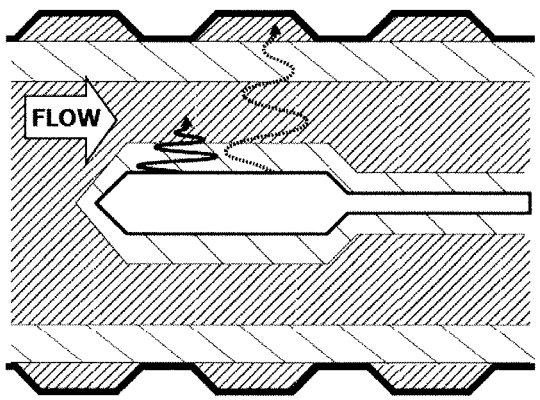
FIG. 32 shows the smooth transducer of FIG. 28 in a flow of yield stress material through a pipe or vessel, the walls of the pipe or vessel being axially aligned with the flow direction and the shaft of the transducer, wherein recesses are provided in the walls of the pipe or vessel.

FIG. 32 shows the smooth transducer of FIG. 28 in a flow of yield stress material through a pipe or vessel, the walls of the pipe or vessel being axially aligned with the flow direction and the shaft of the transducer, wherein recesses are provided in the walls of the pipe or vessel, in this case in the form of circumferential grooves. Material in the recesses is sheltered from the flow and low shear stresses are generated within the recesses, with the result that the material in the recesses remains solid. A liquid boundary layer develops at the walls of the pipe or vessel at but does not extend into the recesses. A liquid boundary layer also develops around the transducer. Therefore waves propagating in the yield stress material from the transducer enter a liquid region followed by a solid region followed by another liquid region at the walls followed by another solid region in the recesses at the walls.

Figure 33:
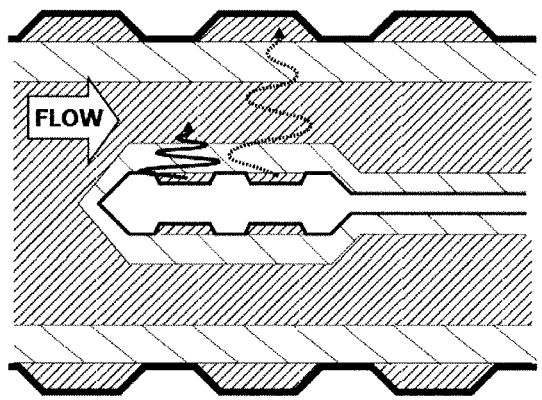
FIG. 33 shows the transducer of FIG. 30 with a contoured profile in a flow of yield stress material through a pipe or vessel, wherein a further boundary layer develops at the walls of the pipe or vessel, the walls of the pipe or vessel being axially aligned with the flow direction and the shaft of the transducer, wherein recesses are provided in the walls of the pipe or vessel.

FIG. 33 shows the transducer of FIG. 30 with a contoured profile in a flow of yield stress material through a pipe or vessel, wherein a further boundary layer develops at the walls of the pipe or vessel, the walls of the pipe or vessel being axially aligned with the flow direction and the shaft of the transducer, wherein recesses are provided in the walls of the pipe or vessel, in this case in the form of circumferential grooves. Therefore waves propagating in the yield stress material from the transducer enter a solid region in the recesses of the transducer followed by a liquid region in the boundary layer at the transducer away from the recesses followed by a solid region followed by a further liquid region at the walls of the pipe or vessel followed by another solid region in the recesses at the walls.

Figure 34:
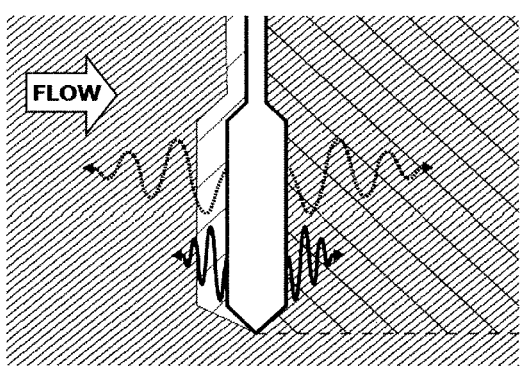
FIG. 34 shows the transducer of FIG. 28 in open flow of yield stress material but, unlike in FIG. 28, the transducer is aligned perpendicular to the flow direction.

FIG. 34 shows the transducer of FIG. 28 in open flow of yield stress material but, unlike in FIG. 28, the transducer is not axially aligned with the flow direction. It is instead aligned perpendicular to the flow direction. In this case, the liquid boundary layer develops on the upstream side of the transducer but the downstream side of the transducer is sheltered from the flow and may remain solid. Thus different propagation paths will be experienced by waves propagating from different sides of the transducer. The orienting of a transducer perpendicular to the flow direction in this way may be advantageously combined with any other techniques in this disclosure, including, but not limited to, the estimating of yield stress via difference in viscosities (e.g. by equation (18)), liquefaction).

Figure 35:
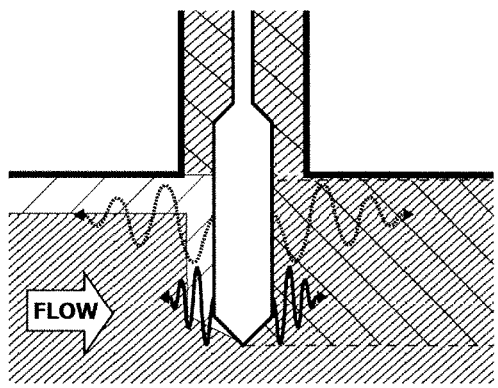
FIG. 35 shows the transducer of FIG. 34 aligned perpendicular to flow in a pipe, wherein the transducer is partially retracted into a recess of the pipe.

FIG. 35 shows the transducer of FIG. 34 aligned perpendicular to flow in a pipe, wherein the transducer is partially retracted into a recess of the pipe. In this case, the liquid boundary layer develops on the upstream side of the transducer but the downstream side of the transducer is sheltered from the flow and may remain solid. In addition, a liquid boundary layer develops at the pipe wall upstream of the transducer. Again, different propagation paths will be experienced by waves propagating from different sides of the transducer, with the upstream propagating waves potentially experiencing the effect of the liquid boundary layer at the transducer and at the wall. In this case, the shaft is aligned perpendicular to the flow direction but other embodiments may have the shaft aligned with (parallel to) the flow direction or at some angle intermediate between perpendicular and parallel.

Figure 36:
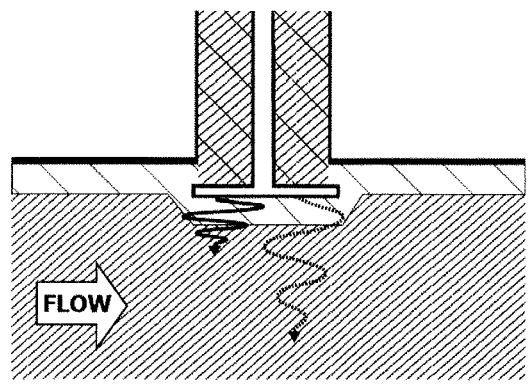
FIG. 36 shows a resonant disc transducer partially retracted into a recess.

FIG. 36 shows a transducer aligned perpendicular to flow in a pipe wherein the transducer is a different shaft-and-bob-type transducer than FIG. 35. The bob is in the form of a disc or short cylinder aligned axially with the shaft. As with FIG. 35, the transducer is partially retracted into a recess of the pipe wall and the disc-like bob is located within what would ordinarily have been the boundary layer at the pipe wall.

FIG. 37A-E shows a series of five bob profiles as possible designs for a transducer of the shaft-and-bob type.

Figure 37A:
FIG. 37 shows a series of side views of five bob profiles as possible designs for a transducer of the shaft-and-bob type.

FIG. 37A shows a bob profile that is smooth sided and similar to the transducer of FIG. 22.

Figure 37B:
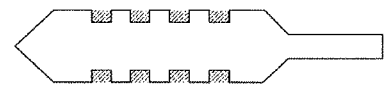

FIG. 37B shows a bob profile that has rectangular-shaped recesses on either side, representing circumferential grooves of rectangular profile.

Figure 37C:

FIG. 37C shows a bob profile that has quadrilateral-shaped recesses on either side that are widest at the outermost edge and narrow toward the axis, representing a circumferential groove with a flat upstream edge aligned transverse to the axis making right-angled corner with the bottom of the recess on the upstream side of the groove and the groove widening from the bottom of the recess in a frustro-conical fashion to the outer diameter of the bob at the downstream side.

Figure 37D:

FIG. 37D shows a bob profile that has triangle-shaped recesses on either side that are widest at the outermost edge and narrow toward the axis, representing a circumferential groove with a flat upstream edge aligned transverse to the axis, widening from the bottom of the recess in a frustro-conical fashion to the outer diameter of the bob at the downstream side.

Figure 37E:

FIG. 37E shows a bob profile that has recesses where the local diameter smoothly varies from a maximum to a minimum in a serpentine manner similar to a sinusoidal edge profile.

Figure 38:
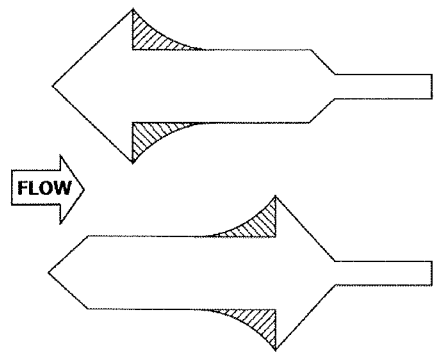
FIG. 38 shows a side view of two further bob designs for a transducer.

FIG. 38 shows two further bob designs for a transducer, in which the recesses/grooves take the form of an abrupt change in diameter. In the uppermost bob profile of FIG. 38, the diameter decreases sharply at a location along the axis as the flow moves downstream. This creates a recessed region in which flowing material is sheltered downstream of the diameter change and so the material may remain solid in this region. In the lowermost bob profile of FIG. 38, the diameter increases sharply at a location along the axis as the flow moves downstream. As the material flows around the transducer, material immediately upstream of the diameter change is retained in a recess and remains solid. Thus in FIG. 38, the recess may be described as relative to a streamline or flow path around the bob, or the bob profile may be viewed as having a ridge, before or after which yield stress material may be retained.

Alternatively, or additionally, the bob may be provided with ridges or recess extending to some axial extent along the bob. This may provide advantages because, for rotational vibrations, a slip layer or surface may form at the resonator surface, wherein the resonator is lubricated by the separation of phases in the yield stress material. If the shear region can be transferred further out from the resonator, then problems due to slip at the resonator surface are reduced or eliminated.

The retention of solid matter at the surface reduces or eliminates the formation of a slip layer at the sensor surface and thus provides improved coupling of the sensor to the fluid.

FIGS. 39A and 39B show bob shapes in a perspective view wherein smooth-bottomed grooves of semi-circular profile are provided spaced around the circumference of the bob extending axially along the bob.

FIG. 39A shows a variant, termed in this disclosure a 'rifled' bob, in which the path of the grooves has an axial and tangential component, leading to a helical path around the outer surface of the bob.

FIG. 39B shows another variant in which the grooves of semi-circular profile are axially aligned with the bob.

FIG. 39C shows a cross-section transverse to the axis of the bob that is applicable to either of the bobs shown in FIGS. 33A and 33B, showing solid yield stress material filling the grooves. The slip region is being moved to a circle taking in the outer extent of the bob, wherein the slip region is predominantly in in the yield stress material.

The 'rifled' bob has a further advantage in that, when axially aligned in the flow direction, it also may shelter material from the flow in its helical grooves in a similar manner to the bobs shown in FIG. 36B-E.

FIGS. 40A and 40B show a further bob variant in cross-sectional and perspective views respectively, in which the shear region is moved away from the resonator surface, in this case by providing vanes in the form of rectangular plates extending outward from the bob, the axis of the bob being coplanar with the vanes. Depending on the size of the vanes, the shear region can be moved as far as desired from the resonator surface, providing more flexibility in design than with grooves, which are limited by the dimensions of the bob.

Alternatively, the above-described techniques may be implemented using another type of viscosity transducer, such as a vibrating-tube-type viscosity transducer. An example of a suitable transducer of this type is described in WO 2017001861 A1. The tube internal surface may be provided with vanes, ridges, or recesses. aligned axially, tangentially, or helically around the tube.

In a further embodiment, a viscosity transducer (such as the viscosity transducer 100 in FIG. 22) is used to detect the beginning of flow in an initially static yield stress material.

A series of viscosity (i.e. damping) readings are taken using the viscosity transducer every 5 seconds for an ongoing sampling period.

Each successive viscosity measurement $V_n$ is compared with its previous viscosity reading $V_{n-1}$. If $V_n$ is greater than $V_{n-1}$ by more than a threshold, e.g. if $V_n > \varepsilon \cdot V_{n-1}$, where $\varepsilon$ is a threshold ratio that is greater than 1 (e.g. 2), then the fluid is determined to have begun to flow.

In a further embodiment, two or more successive samples are averaged together, and the averaged samples are compared with preceding averages of successive samples, with the averaging effect serving as a low-pass filter to reduce the effect of noise and non-physical spikes and transients in the detection of flow.

Alternatively, the above-described techniques may be implemented using another type of viscosity transducer, such as a vibrating-tube-type viscosity transducer. An example of a suitable transducer of this type is described in WO 2017001861 A1.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In the context of this disclosure, the term "based on" does not mean "based only on," unless expressly specified otherwise. In other words, the term "based on" describes both "based only on" and "based at least on." The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

While much of this disclosure has focused on the use of shear wave propagation in the fluid, which may be a particularly advantage type of wave propagation for the techniques described herein, the techniques are not limited to shear wave propagation, such as caused by a vibrating surface vibrating in plane, e.g. in the case of a torsional transducer. Other body waves generated by other modes of vibration, such as produced by longitudinal or lateral vibration of a bob or other vibrating element, may be used instead of or in combination with shear waves.

The methods, process and algorithms that have been described may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. In the context of this disclosure, the term "code" may refer to software, instructions, code or data that is/are executable by a computing device or processor.

A processing module may comprise a computer including a processor for processing data and controlling systems according to the techniques and apparatus of the present disclosure. Alternatively, or additionally, the processing module may comprise electronic circuitry to perform the same functions, such as in the form of an FPGA (field programmable gate array) circuit and/or an ASIC (application specific integrated circuit), and/or a microcontroller.

Software or instructions or data may also be transmitted over a transmission medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of transmission medium.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

The headings provided herein are for convenience only and do not necessarily affect the scope or meaning of the aspects of this the disclosure defined by the claims.

Some embodiments have been described. These embodiments are presented by way of example only and are not intended to limit the scope of the disclosure. Indeed, the novel methods, apparatus and systems described herein may be embodied in a variety of other forms. It should be apparent to those skilled in the art that many more modifications besides those already described are possible without departing from the inventive concepts herein. For example, all methods described in the present disclosure may be alternatively embodied in apparatus for performing such methods, such as an apparatus comprising means for carrying out each step of such methods. As another example, all methods described in the present disclosure may be alternatively embodied in the form of a non-transitory (tangible) computer readable medium having instructions stored thereon that, when executed by a processor cause the processor to carry out the corresponding method.

While endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A method of estimating the yield stress of a flowing yield stress fluid using one or more vibratory transducers having a vibratory surface in contact with the yield stress fluid, the method comprising:
    vibrating a vibratory surface of a vibratory transducer to transmit a wave from a vibrating surface into a viscoplastic boundary layer of the flowing yield stress fluid;
    making, using the vibrations of the vibratory transducer, a plurality of measurements of the degree of damping of vibration including a first measurement and a second measurement, wherein the first measurement of the degree of damping of vibration is made with the vibratory surface of a vibratory transducer vibrating at a first frequency of vibration to transmit a wave that propagates a first distance into the viscoplastic boundary layer of the flowing yield stress fluid, wherein the second measurement of the degree of damping of vibration is made with the vibratory surface of a vibratory transducer vibrating at a second frequency of vibration that is different from the first frequency to transmit a wave that propagates a second distance into the viscoplastic boundary layer of the flowing yield stress fluid that is lower than the first distance; and
    estimating the yield stress of the flowing yield stress fluid based on the plurality of measurements of the degree of damping of vibration, wherein the yield stress of the flowing yield stress fluid is estimated based on a linear combination of the first and second measurements of the degree of damping of vibration.

2. The method of claim 1, further comprising:
    performing a correction to one or both of the first and second measurements of the degree of damping of vibration based on the first and second frequencies of vibration and the power law index of the yield stress fluid.

3. The method of claim 1, wherein the estimate of the yield stress of the flowing yield stress fluid is proportional to:

$$\left(V1 - V2\left(\frac{\omega 1}{\omega 2}\right)^{n-1}\right),$$

wherein V1 is the first measurement of the degree of damping of vibration, V2 is the second measurement of the degree of damping of vibration, w1 is the angular frequency of the first frequency of vibration, w2 is the angular frequency of the second frequency of vibration, and n is the power law index.

4. The method of claim 2, further comprising:
making a third measurement of the degree of damping of vibration with the vibratory surface of a vibratory transducer vibrating at a third frequency of vibration that is different from the first and second frequencies of vibration to transmit a wave that propagates a third distance into the viscoplastic boundary layer of the flowing yield stress fluid that is less than the first distance; and
estimating the power law index of the flowing yield stress fluid based on the third measurement of the degree of damping of vibration and the third frequency of vibration and further based on one of:
the first measurement of the degree of damping of vibration and the first frequency of vibration; and
the second measurement of the degree of damping of vibration and the second frequency of vibration.

5. The method of claim 1, further comprising estimating a flow velocity of the flowing yield stress fluid based the ratio of the first and second measurements of the degree of damping of vibration.

6. The method of claim 1, wherein one or more recesses or one or more ridges are provided on a vibrating surface of the one or more vibratory transducers, or are provided on an adjacent portion of a conduit wall.

7. The method of claim 6, wherein the one more vibratory transducers comprise a vibratory transducer configured to vibrate in a torsional mode and having a shaft and a bob located at one end of the shaft, the shaft having an axis and the vibratory transducer being configured to vibrate in a torsional mode about the axis of the shaft, wherein the bob comprises one or more recesses or ridges on the surface of the bob.

8. The method of claim 7, the one or more recesses or ridges on the surface of the bob are configured to shelter yield stress fluid from the flow.

9. The method of claim 8, wherein the bob is axially symmetric and the one or more recesses or ridges extend around its circumference.

10. The method of claim 8, wherein the bob comprises one or more recesses or ridges on the surface of the bob that extend in a direction on the surface of the bob that is neither perpendicular to nor parallel with the axis of the shaft.

11. The method of claim 10, wherein the one or more recesses or ridges on the surface of the bob extend helically around the surface of the bob.

12. The method of claim 7, wherein the one or more recesses or ridges on the surface of the bob extend in a direction parallel to the axis of the shaft.

13. The method of claim 6, wherein the conduit comprises one or more ridges or recesses on its interior surface adjacent the one or more vibratory transducers.

14. The method of claim 13, wherein the conduit comprises one or more recess on its interior surface and a portion of a vibratory transducer is located within the recess.

15. The method of claim 6, wherein the one or more vibratory transducers comprise a vibrating tube transducer.

16. The method of claim 15, wherein the vibrating tube transducer comprises one or more recesses or ridges on the interior surface of the vibrating tube that are configured to shelter yield stress fluid from the flow.

17. The method of claim 16, wherein the interior surface of the vibrating tube transducer is axially symmetric and the one or more recesses or ridges extend around its circumference.

18. The method of claim 16, wherein the interior surface of the vibrating tube transducer comprises one or more recesses or ridges that extend in a direction on the interior surface of the vibrating tube transducer that is neither perpendicular to nor parallel with the axis of the vibrating tube transducer.

19. The method of claim 18, wherein the one or more recesses or ridges on the interior surface of the vibrating tube transducer extend helically around the interior surface.

20. The method of claim 15, wherein the one or more recesses or ridges on the interior surface of the vibrating tube transducer extend in a direction parallel to the axis of the vibrating tube transducer.

21. The method of claim 15, wherein the vibrating tube transducer is configured to vibrate in a torsional mode.

22. The method of claim 1, wherein measurements are made using multiple vibratory transducers.

23. The method of claim 1, wherein the measurements are made using only a single vibratory transducer.

24. The method of claim 1, wherein measurements are made using one or more vibratory transducers vibrating in torsional modes.

25. The method of claim 1, wherein the viscosity of the yield stress fluid and the flow rate are constant and the estimate of the yield stress is equal to the measured degree of damping of vibration multiplied by a constant of proportionality for the given constant viscosity and flow rate.

26. The method of claim 25, comprising making multiple measurements of the degree of damping of vibration of a flowing yield stress fluid using a single vibratory transducer at a single frequency to monitor changes in yield stress.

27. An apparatus for estimating the yield stress of a flowing yield stress fluid, the apparatus comprising:
one or more vibratory transducers, each having a vibratory surface;
a processing module configured to:
vibrate a vibratory surface of one of the one or more vibratory transducers to transmit a wave from the vibrating surface into a viscoplastic boundary layer of a flowing yield stress fluid;
make, using the vibrations of the vibratory transducer, a plurality of measurements of the degree of damping of vibration including a first measurement and a second measurement, wherein the first measurement of the degree of damping of vibration is made with the vibratory surface of a vibratory transducer vibrating at a first frequency of vibration to transmit a wave that propagates a first distance into the viscoplastic boundary layer of the flowing yield stress fluid, wherein the second measurement of the degree of damping of vibration is made with the vibratory surface of a vibratory transducer vibrating at a second frequency of vibration that is different from the first frequency to transmit a wave that propagates a second distance into the viscoplastic boundary layer of the flowing yield stress fluid that is lower than the first distance; and
estimate the yield stress of the flowing yield stress fluid based on the one or more measurements of the degree of damping of vibration, wherein the yield stress of the flowing yield stress fluid is estimated based on a linear combination of the first and second measurements of the degree of damping of vibration.

28. The apparatus of claim 27, wherein the processing module is further configured to:
perform a correction to one or both of the first and second measurements of the degree of damping of vibration based on the first and second frequencies of vibration and the power law index of the yield stress fluid.

29. The apparatus of claim 27, wherein the estimate of the yield stress of the flowing yield stress fluid is proportional to:

$$\left(V1 - V2\left(\frac{\omega 1}{\omega 2}\right)^{n-1}\right),$$

wherein V1 is the first measurement of the degree of damping of vibration, V2 is the second measurement of the degree of damping of vibration, w1 is the angular frequency of the first frequency of vibration, w2 is the angular frequency of the second frequency of vibration, and n is the power law index.

30. The apparatus of claim 28, wherein the processing module is further configured to:
make a third measurement of the degree of damping of vibration with the vibratory surface of a vibratory transducer vibrating at a third frequency of vibration that is different from the first and second frequencies of vibration to transmit a wave that propagates a third distance into the viscoplastic boundary layer of the flowing yield stress fluid that is less than the first distance; and
estimate the power law index of the flowing yield stress fluid based on the third measurement of the degree of damping of vibration and the third frequency of vibration and further based on one of:
the first measurement of the degree of damping of vibration and the first frequency of vibration; and
the second measurement of the degree of damping of vibration and the second frequency of vibration.

31. The apparatus of claim 27, wherein the processing module is further configured to estimate a flow velocity of the flowing yield stress fluid based the ratio of the first and second measurements of the degree of damping of vibration.

32. The apparatus of claim 27, wherein one or more recesses or one or more ridges are provided on a vibrating surface of the one or more the vibratory transducers, or are provided on an adjacent portion of a conduit wall.

33. The apparatus of claim 32, wherein the one more vibratory transducers comprise a vibratory transducer configured to vibrate in a torsional mode and having a shaft and a bob located at one end of the shaft, the shaft having an axis and the vibratory transducer being configured to vibrate in a torsional mode about the axis of the shaft, wherein the bob comprises one or more recesses or ridges on the surface of the bob.

34. The apparatus of claim 33, the one or more recesses or ridges on the surface of the bob are configured to shelter yield stress fluid from the flow.

35. The apparatus of claim 34, wherein the bob is axially symmetric and the one or more recesses or ridges extend around its circumference.

36. The apparatus of claim 34, wherein the bob comprises one or more recesses or ridges on the surface of the bob that extend in a direction on the surface of the bob that is neither perpendicular to nor parallel with the axis of the shaft.

37. The apparatus of claim 36, wherein the one or more recesses or ridges on the surface of the bob extend helically around the surface of the bob.

38. The apparatus of claim 33, wherein the one or more recesses or ridges on the surface of the bob extend in a direction parallel to the axis of the shaft.

39. The apparatus of claim 32, wherein the conduit comprises one or more ridges or recesses on its interior surface adjacent the one or more vibratory transducers.

40. The apparatus of claim 39, wherein the conduit comprises one or more recess on its interior surface and a portion of a vibratory transducer is located within the recess.

41. The apparatus of claim 32, wherein the one or more vibratory transducers comprise a vibrating tube transducer.

42. The apparatus of claim 41, wherein the vibrating tube transducer comprises one or more recesses or ridges on the interior surface of the vibrating tube that are configured to shelter yield stress fluid from the flow.

43. The apparatus of claim 42, wherein the interior surface of the vibrating tube transducer is axially symmetric and the one or more recesses or ridges extend around its circumference.

44. The apparatus of claim 42, wherein the interior surface of the vibrating tube transducer comprises one or more recesses or ridges that extend in a direction on the interior surface of the vibrating tube transducer that is neither perpendicular to nor parallel with the axis of the vibrating tube transducer.

45. The apparatus of claim 44, wherein the one or more recesses or ridges on the interior surface of the vibrating tube transducer extend helically around the interior surface.

46. The apparatus of claim 41, wherein the one or more recesses or ridges on the interior surface of the vibrating tube transducer extend in a direction parallel to the axis of the vibrating tube transducer.

47. The apparatus of claim 41, wherein the vibrating tube transducer is configured to vibrate in a torsional mode.

48. The apparatus of claim 27, wherein the measurements are made using multiple vibratory transducers.

49. The apparatus of claim 27, wherein the measurements are made using only a single vibratory transducer.

50. The apparatus of claim 27, wherein the measurements are made using one or more vibratory transducers vibrating in torsional modes.

51. The apparatus of claim 27, wherein the viscosity of the yield stress fluid and the flow rate are constant and the estimate of the yield stress is equal to the measured degree of damping of vibration multiplied by a constant of proportionality for the given constant viscosity and flow rate.

52. The apparatus of claim 51, wherein the processing module is further configured to make multiple measurements of the degree of damping of vibration of a flowing yield stress fluid using a single vibratory transducer at a single frequency to monitor changes in yield stress.

53. An apparatus for estimating the yield stress of a flowing yield stress fluid using one or more vibratory transducers having a vibratory surface in contact with the yield stress fluid, the apparatus comprising:
means for vibrating a vibratory surface of a vibratory transducer to transmit a wave from a vibrating surface into a viscoplastic boundary layer of the flowing yield stress fluid;
means for making, using the vibrations of the vibratory transducer, a plurality of measurements of the degree of damping of vibration including a first measurement and a second measurement, wherein the first measurement of the degree of damping of vibration is made with the vibratory surface of a vibratory transducer vibrating at a first frequency of vibration to transmit a wave that propagates a first distance into the viscoplastic boundary layer of the flowing yield stress fluid, wherein the second measurement of the degree of damping of vibration is made with the vibratory surface of a vibratory transducer vibrating at a second frequency of vibration that is different from the first frequency to transmit a wave that propagates a second distance into the viscoplastic boundary layer of the flowing yield stress fluid that is lower than the first distance; and means for estimating the yield stress of the flowing yield stress fluid based on the one or more measurements of the degree of damping of vibration, wherein the yield stress of the flowing yield stress fluid is estimated based on a linear combination of the first and second measurements of the degree of damping of vibration.

54. A non-transitory computer-readable medium having stored thereon instructions that, when executed by one or more processors, cause the one or more processors to:

vibrate a vibratory surface of a vibratory transducer to transmit a wave from a vibrating surface into a viscoplastic boundary layer of a flowing yield stress fluid;

make, using the vibrations of the vibratory transducer, a plurality of measurements of the degree of damping of vibration including a first measurement and a second measurement, wherein the first measurement of the degree of damping of vibration is made with the vibratory surface of a vibratory transducer vibrating at a first frequency of vibration to transmit a wave that propagates a first distance into the viscoplastic boundary layer of the flowing yield stress fluid, wherein the second measurement of the degree of damping of vibration is made with the vibratory surface of a vibratory transducer vibrating at a second frequency of vibration that is different from the first frequency to transmit a wave that propagates a second distance into the viscoplastic boundary layer of the flowing yield stress fluid that is lower than the first distance; and estimate the yield stress of the flowing yield stress fluid based on the one or more measurements of the degree of damping of vibration, wherein the yield stress of the flowing yield stress fluid is estimated based on a linear combination of the first and second measurements of the degree of damping of vibration.

* * * * *